US012811506B2

(12) United States Patent
Riddell et al.

(10) Patent No.: US 12,811,506 B2
(45) Date of Patent: Nov. 24, 2026

(54) SELF-COMMUTATING DC TO DC CONVERTERS WITH SWITCHED CONNECTIVITY AND RECONFIGURABLE ELEMENTS ENABLING SWITCHING

(71) Applicant: WePower Technologies LLC, Sagaponack, NY (US)

(72) Inventors: Michael Joseph Riddell, Glastonbury, CT (US); Jeffrey Charles Andle, Orlando, FL (US)

(73) Assignee: WePower Technologies LLC, Sagaponack, NY (US)

( * ) Notice: Subject to any disclaimer, the term of this patent is extended or adjusted under 35 U.S.C. 154(b) by 201 days.

(21) Appl. No.: 18/404,163

(22) Filed: Jan. 4, 2024

(65) Prior Publication Data

US 2024/0223095 A1 Jul. 4, 2024

Related U.S. Application Data

(60) Provisional application No. 63/520,966, filed on Aug. 22, 2023, provisional application No. 63/478,403, filed on Jan. 4, 2023.

(51) Int. Cl.
*H02M 3/335* (2006.01)
*H02M 3/06* (2006.01)

(52) U.S. Cl.
CPC .......... *H02M 3/33576* (2013.01); *H02M 3/06* (2013.01)

(58) Field of Classification Search
CPC ................................................ H02M 3/06–078
See application file for complete search history.

(56) References Cited

U.S. PATENT DOCUMENTS 6,011,704 A * 1/2000 Coleman ................. H02M 3/28 363/67
2003/0173996 A1* 9/2003 Lewis ..................... H02M 3/07 326/136
2009/0273969 A1* 11/2009 Taylor ................. G11C 11/5678 365/163
2009/0290384 A1 11/2009 Jungreis
2009/0290385 A1 11/2009 Jungreis et al.
2014/0022826 A1 1/2014 He et al.
(Continued)

FOREIGN PATENT DOCUMENTS

WO 2024148172 A2 7/2024

*Primary Examiner* — Peter M Novak
(74) *Attorney, Agent, or Firm* — Mintz, Levin, Cohn, Ferris, Glovsky and Popeo, P.C.

(57) ABSTRACT

System and apparatuses for enabling efficient energy harvesting are disclosed. A power conversion apparatus comprises at least a first inductor and a second inductor, a rectifier, a load, and at least a first bulk capacitor and a second bulk capacitor. The first inductor is galvanically isolated from the second inductor and each of the first inductor and the second inductor is an output-inductor of the power conversion apparatus and the rectifier is configured to charge at least the first bulk capacitor and the second bulk capacitor. Each of the at least the first bulk capacitor and the second bulk capacitor is coupled to the load, and interconnections of the at least the first bulk capacitor and the second bulk capacitor is switched between at least one of from an electrical series connection to an electrical parallel connection and from the electrical parallel connection to the electrical series connection.

9 Claims, 21 Drawing Sheets

(56) References Cited

U.S. PATENT DOCUMENTS

| | | | | |
|---|---|---|---|---|
| 2017/0047744 | A1 | 2/2017 | Kim et al. | |
| 2017/0085183 | A1 | 3/2017 | Notsch | |
| 2018/0019667 | A1* | 1/2018 | Salem | H02M 3/07 |
| 2021/0167690 | A1* | 6/2021 | Nakahara | H02M 1/0074 |

* cited by examiner

SELF-COMMUTATING DC TO DC CONVERTERS WITH SWITCHED CONNECTIVITY AND RECONFIGURABLE ELEMENTS ENABLING SWITCHING

CROSS-REFERENCE TO RELATED APPLICATIONS

This application claims the benefit of two U.S. Provisional Applications, namely U.S. Provisional Application having U.S. Provisional Application Ser. No. 63/478,403, titled "RECONFIGURABLE ELEMENTS FOR ENERGY HARVESTING" and U.S. Provisional Application having U.S. Provisional Application Ser. No. 63/520,966, titled "IMPROVED SWITCHING POWER CONVERTER." The contents of U.S. Provisional Application having U.S. Provisional Application Ser. No. 63/478,403 and U.S. Provisional Application having U.S. Provisional Application Ser. No. 63/520,966 are incorporated by reference herewith in their entireties.

TECHNICAL FIELD

The subject matter described herein generally relates to enabling efficient energy harvesting.

BACKGROUND

Energy harvesting has been utilized with a plurality of devices of various shapes, dimensions, and capabilities. In particular, energy harvesting has been utilized in association with sensors and controls that are mobile, that operate without batteries, and which have the ability to perform wireless communication. For example, improvements have been made that are related to devices that operate on continuous low power modes of operation with intermittent power draw from a quasi-continuous power source. These power sources are associated with lower wattage and voltage. Advances and improvements have been made with respect to the collection and transmission of information about transient situations, e.g., a condition that occurs after a switching action. It is noted that transient conditions, as opposed to steady state conditions, can occur for a time period of a microsecond to hundreds of milliseconds and depend on various circuit parameters such as resistance, inductance, capacitance, and so forth. The magnitude of the transient voltage fluctuates until a steady-state condition is achieved.

However, some challenges associated with transient energy harvesting sources include relatively low resonant frequencies and high source impedances. A challenge is that there can be relatively deep and wide dropouts of available power generated by transient energy harvesting sources due to multiple zero crossings of the resonant waveform at a particular time scale that is larger than the time scale at which standard capacitive storage methods filter.

Accordingly, a transient energy harvesting apparatuses and systems that address and overcome the above described deficiencies can be desirable.

SUMMARY

The aspects and examples as described in the present disclosure address and overcome the above described challenges with current transient energy harvesting apparatuses and systems. In particular, the aspects and examples of the present disclosure describe a technique of improving the efficiency of energy transfer during a transient condition by varying the properties of the inductive source and the capacitive load over a particular time frame for the purpose of optimizing voltage ratio.

Systems and apparatuses for optimization of voltage ratio and improving energy transfer efficiency are described herein. Further, systems and apparatuses pertaining to DC to DC converters that facilitate the commutation of recovered energy to an array of bulk capacitors regardless of their connectivity state and which enable a more consistent current flow in the source impedance are also described herein. Related apparatuses and techniques are also described.

In one aspect, a power conversion apparatus can comprise at least a first inductor and a second inductor, a rectifier, a load, and at least a first bulk capacitor and a second bulk capacitor. In some aspects, the first inductor can be galvanically isolated from the second inductor and each of the first inductor and the second inductor can be an output-inductor of the power conversion apparatus. In some aspects, the rectifier can be configured to charge at least the first bulk capacitor and the second bulk capacitor and each of the at least the first bulk capacitor and the second bulk capacitor can be coupled to the load, and interconnections of the at least the first bulk capacitor and the second bulk capacitor can be switched between at least one of from an electrical series connection to an electrical parallel connection and from the electrical parallel connection to the electrical series connection. In aspects, the power conversion apparatus can further include a third inductor, wherein the third inductor can be an input inductor that is galvanically isolated from the at least the first inductor and the second inductor and can be coupled to the at least the first inductor and the second inductor via isolated functional coupling.

In some aspects, the power conversion apparatus of example 1, can further comprise a third inductor and a fourth inductor, wherein each of the third inductor and the fourth inductor can be an input inductor. In some aspects, each of the at least the first inductor and the second inductor can be galvanically isolated from each of the third inductor and the fourth inductor, and the at least the first inductor can be galvanically isolated from the at least the second inductor. In some aspects, each of the first inductor and the second inductor can be coupled to at least one of the third inductor and the fourth inductor via a magnetic field based connection. Alternatively, in some aspects, each of the at least the first inductor and the second inductor can be coupled to at least one of the third inductor and the fourth inductor via a capacitive connection. In some aspects, the power conversion apparatus can comprise an input source. In some aspects, wherein each of the at least the first inductor and the second inductor is coupled to the input source, and the coupling to the input source is switched in an alternating manner such that only one input inductor is connected to said input source at a time. In some aspects, the power conversion apparatus can further comprise a plurality of switched input inductors, wherein each of the plurality of switched input inductors can be coupled to a corresponding output inductor via isolated functional coupling, and each of the at least the first inductor and the second inductor can be coupled to a corresponding bulk capacitor through a rectifying element.

In another aspect, a system can comprise at least two output inductors, a rectifier, a plurality of switches, at least two bulk capacitors, and a load. In some aspects, each of the at least two output inductors can be coupled to one of the at least two bulk capacitors via the rectifier, and the plurality of switches can be operable to commutate the at least two bulk capacitors to an output in an electrical series connection or an electrical parallel connection. In aspects, the system can be based on a DC to DC converter.

In another aspect, an apparatus comprises a plurality of windings that can be magnetically coupled to an energy source. In aspects, each of the plurality of windings can have a property, wherein the property can correspond to an inductance, a current, or a stored energy, and a plurality of switches. In aspects, each of the plurality of switches can be communicatively coupled to windings so as to place said windings in a plurality of combinations of series and parallel connections. In some aspects, the control logic can operate the plurality of switches for controlling the plurality of windings. In some aspects, the property can be uniform for the plurality of windings, the plurality of windings can include two windings, and the plurality of switches can include three switches that can be configurable to situate the plurality of windings in a series configuration and a parallel configuration relative to a load.

In some aspects, the plurality of windings can comprise four windings and the plurality of switches can comprise nine switches for configuring the plurality of windings and the plurality of switches in a 4-series, a 4-parallel, and a 2×2 configurations relative to a load. In some aspects, the plurality of windings can comprise two windings and the plurality of switches can comprise seven switches for providing a series and a parallel state of connection of the windings and a positive or a negative connection of the plurality of windings relative to a load. In some aspects, at least one switch of the plurality of switches can be modulated to control power to a load.

In another aspect, a system can comprise a plurality of capacitors, a plurality of switches, and control logic. In aspects, each of the plurality of capacitors can have a property corresponding to a capacitance, a voltage, or a stored energy. In aspects, each of the plurality of switches can be communicatively coupled to the plurality of capacitors so as to place the plurality of capacitors in a plurality of combinations of series and parallel connections. In aspects, the control logic can operate the plurality of switches for controlling a connection of the plurality of capacitors. In some aspects, the property can be uniform for the plurality of capacitors. In aspects, each of the plurality of capacitors can comprise two capacitors and the plurality of switches can provide a series and a parallel state of connection of the plurality of capacitors to a source. In aspects, the plurality of capacitors can include four capacitors and the plurality of switches can include nine switches. In aspects, the capacitors and switches can be configurable in a 4-series, a 4-parallel, and a 2×2 configuration.

In another aspect, a system comprises a plurality of capacitors and three switches, and the plurality of capacitors can be electrically coupled in a multiple recursive stage based sub-circuit. In some aspects, a first stage can comprise a subset of the plurality of capacitors and the three switches, and the three switches can be operable to alter a connection of the subset of the plurality of capacitors from a series connection to a parallel-connection and from the parallel-connection to the series connection. In some aspects, the system can further comprise a plurality of galvanically isolated output inductors. In some aspects, each of the plurality of galvanically isolated output inductors can be coupled to a corresponding one of the plurality of capacitors using a rectifying component. In some aspects, the system can further comprise at least one input inductor. In some aspects, the plurality of galvanically isolated output inductors can be coupled to the at least one input inductor via an isolated functional coupling connection.

In yet another aspect, a system comprises a plurality of capacitors, a rectifier, a controller, and a plurality of switches. In aspects, the plurality of switches can be operably connected with the plurality of capacitors and the controller can be operable to control each of the plurality of switches to alter a connection-status of the plurality of capacitors from a series connected configuration to a parallel connected configuration and from the parallel connected configuration to the series connected configuration. In some aspects, the system can further comprise a plurality of galvanically isolated output inductors. In some aspects, each of the plurality of galvanically isolated output inductors can be coupled to a corresponding one of the plurality of capacitors by the rectifier. In some aspects, the system can further comprise at least one input inductor. In some aspects, the plurality of galvanically isolated output inductors can be coupled to the at least one input inductor via an isolated functional coupling connection.

Details regarding various aspects and examples that are based on varying the properties of the inductive source and capacitive load are provided in greater detail in this disclosure.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 10 further shows said DC to DC converter charging a switched array of capacitors according to other aspects described and illustrated herein;

DETAILED DESCRIPTION

Figure 1:
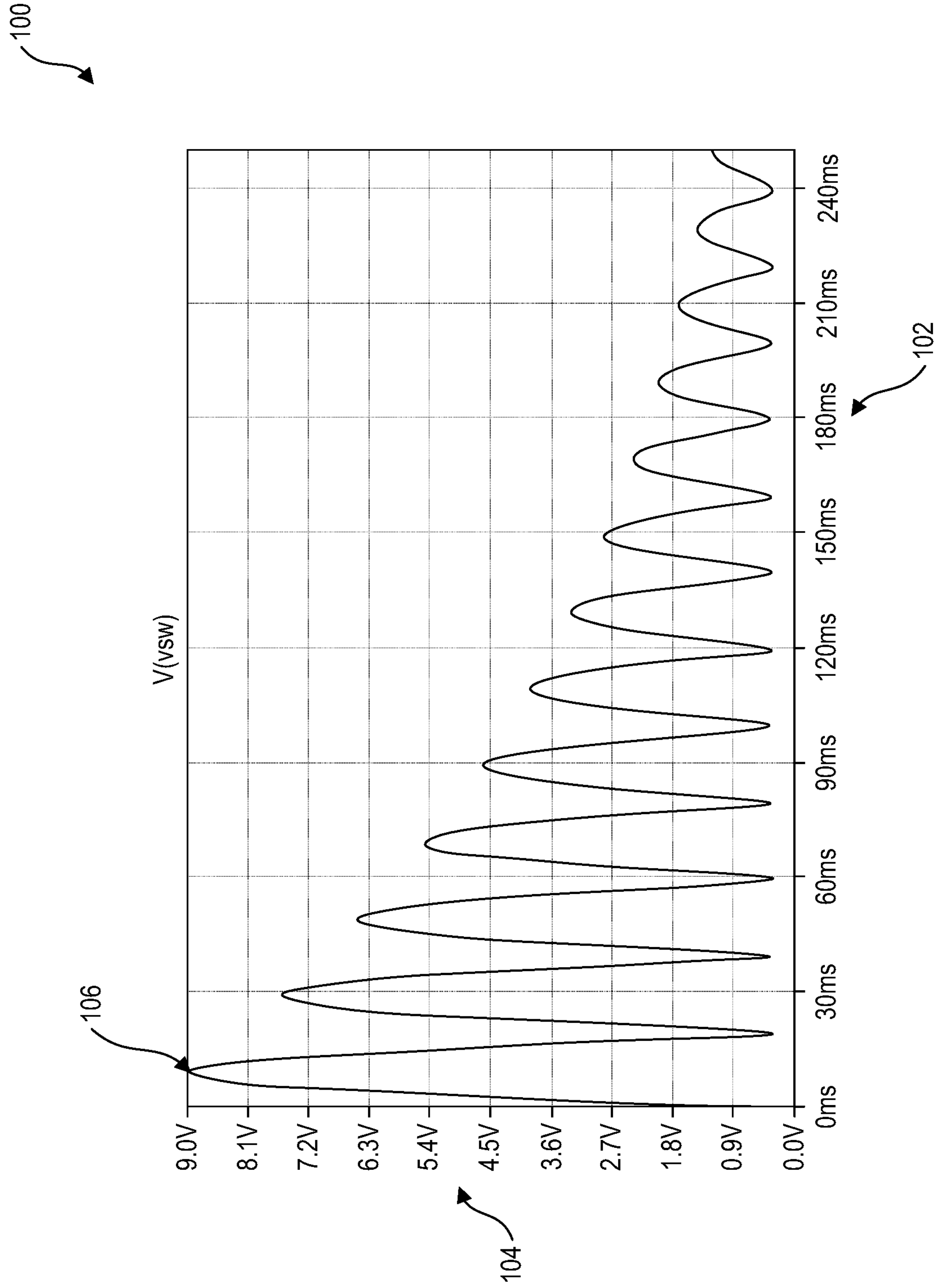
FIG. 1 depicts an example graphical representation of the rectified output of a damped sinusoidal output inductive energy harvester, according to some aspects described and illustrated herein.

As stated above, the aspects and examples described in the present disclosure are directed to a technique of improving the efficiency of energy transfer and regulation during a transient condition by varying the properties of the inductive energy source and the capacitive energy storage over a particular time frame for the purpose of improving the harvested energy that can be utilized by a load device. In aspects, load devices can be associated with an overvoltage limit, an undervoltage limit, and a suitable operating voltage. In aspects, the voltage ratio is representative of a ratio of the particular undervoltage ($V_{UV}$) of a device relative to an input overvoltage ($V_{OV}$) of the device, which is represented, e.g., $r=V_{UV}/V_{OV}$. Broadly speaking, energy harvesting and power conversion industry focuses on providing continuous power for the purpose of operating various devices within certain operational limits and within a threshold of a desirable operating voltage. The techniques implemented by this industry fail, however, to adequately address improving the recovery of energy from finite, transient energy sources.

Systems that are not based on batteries, e.g., capacitor based systems, have an approximately linear relationship between the square of the voltage and the stored energy, which enables a small amount of energy to be stored and delivered, namely an amount of energy having a value between the undervoltage value and overvoltage value. Further, the linear relationship between the square of the voltage and the stored energy results in an amount of stored energy that unused, as it is associated with capacitor voltages that are below the undervoltage limit of the load device. In aspects, energy that is recovered from a finite source is stored in a bulk capacitor and input into a regulator. The finite source operates to increase or decrease the capacitor voltage between a particular overvoltage threshold level and a particular undervoltage threshold level. However, in aspects, the bulk capacitor cannot be charged beyond a particular input overvoltage value of a point of use regulator, e.g., 5.4 Volts (V). Further, the regulator is unable to provide a desired output voltage if the bulk capacitor discharges a value below the under-voltage lockout voltage of 1.8 V. In aspects, with the variable of r having a value of ⅓, a capacitor that is fully charged to 5.4V and then discharged to a load can have $r^2$ having a value of $1/9$ of a particular remaining charge. In aspects, this unused energy can be lost to leakage currents before the capacitor is recharged. Certain characteristics of a capacitor, e.g., capacitor non-linearity, the capacitance versus voltage curve, and so forth, further reduces the energy that can be used by the load during a charge and discharge cycle. In aspects, even if the regulator operated at 100% efficiency, a fully charged capacitor at a capacity of 5.4 V can only be consumed down to 1.8 V, thereby leaving approximately 11% of the harvested energy on the bulk capacitor unused. In aspects, certain circuit configurations of the present disclosure utilize a portion of this approximately 11% of unused energy by changing a connected state of a circuit (e.g., from a series circuit connection to a parallel circuit connection), and as such, enable recover of approximately 75% of the unused energy and reduce overall losses to approximately 3%.

In aspects, another circuit configuration is described herein that relates to an improved version of a DC to DC converter in which the currents in the source impedance can be maintained at a more constant value. Further, the improved version of this converter commutates the recovered energy to an array of bulk capacitors irrespective of the state of their connectivity (e.g., irrespective of whether the capacitors are connected in series or in parallel), thereby improving the overall output commutation circuit.

FIG. 1 depicts an example graphical representation 100 of a damped sinusoidal output of an inductive energy harvester with ideal rectification. As shown in the example graphical representation 100, an x-axis corresponds to time values 102 and a y-axis corresponds to voltage values 104. The example graphical representation 100 can be associated with a 25 Hz mechanical energy source that can be obtained through an inductive pick-up. Such a mechanical energy source can have a nominal inductance of 100 mH (15.7 Ohms reactance at 25 Hz) and a source resistance of 100 Ohms. Further, the rectified energy can be represented as a pulsed half sine wave with a periodicity of 20 milliseconds (ms) and an open circuit voltage of 9 V at a first peak 106.

In aspects, a technique that can be implemented can include charging the capacitor with the decaying voltage as shown in the example graphical representation 100, thereby enabling the storing of energy for the future. However, with the charging of the capacitor, the capacitor's voltage can increase and as such, the decaying waveform may not, after a particular threshold, be able to passively push charge into the capacitor. While use of a capacitor with a larger capacitance can mitigate this issue, the larger capacitance of the capacitor can present a lower impedance at a given frequency. Additionally, the losses due to source resistance can increase based on the square of this current while the rate of charge experiences only a linear increase. This could result in significant losses, e.g., during device start up. Such losses may not be consequential for a device that functions in continuous operation, but for operations that are performed with transient energy harvesting sources, such losses are significant and can disrupt or prevent operation of various device functions.

It is noted that the application of a harvester to a load can operate to cause losses in the windings. The application of the harvester to the load also functions to shorten the time window during which the energy is available. For a continuous energy source with low reactance relative to the winding resistance, a particular power value and a particular energy transfer are both attained when resistance of the load is equivalent to the resistance of the winding, e.g., represented by the expression $R_{LOAD}=R_{WINDING}$. However, for a finite energy source, removing energy at a particular power transfer condition (e.g., a high power transfer condition) may not provide suitable energy transfer (e.g., high energy transfer). For example, in aspects, a load resistance that is equal to about 1.5 times the parasitic winding resistance can operate to improve the energy recovery. Further, any deviation from an expected 1 to 1 matched load desirable for a suitable power transfer (e.g., a high or maximum power transfer) can be explained by the reduced duration of power transfer due to the finite energy. The higher the value of the load resistance during the duration of the damped sine waveform, the larger the reduction in the power transfer rate, with a suitable or desirable range being approximately between 1.5 to 1.

Figure 2:
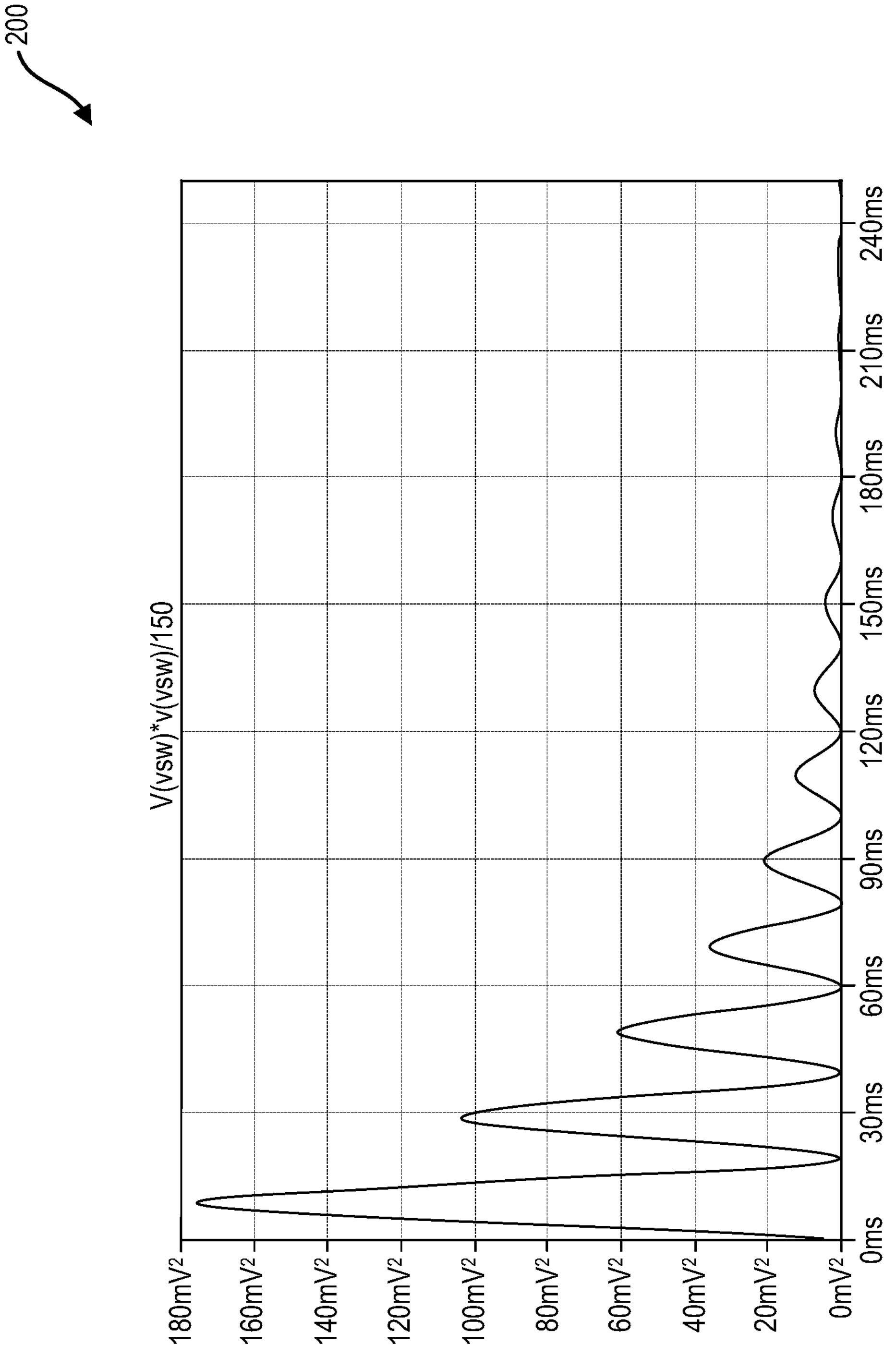
FIG. 2 depicts an example graphical representation of a power value dissipated in a resistive load from a damped source, according to some aspects described and illustrated herein.

FIG. 2 depicts an example graphical representation 200 of a power value dissipated in a resistive load from a damped source. The graphical representation 200 represents a maximum energy value that can be extracted during a particular transient event by, e.g., integrating the area under the curve. With respect to the example graphical representation 200, an upper bound of 4.3 millijoules (mJ) of energy can be available to a resistive load through an ideal rectifier. Real rectifiers can have losses and attain energy of approximately 3.4 mJ to 4 mJ.

Figure 3:
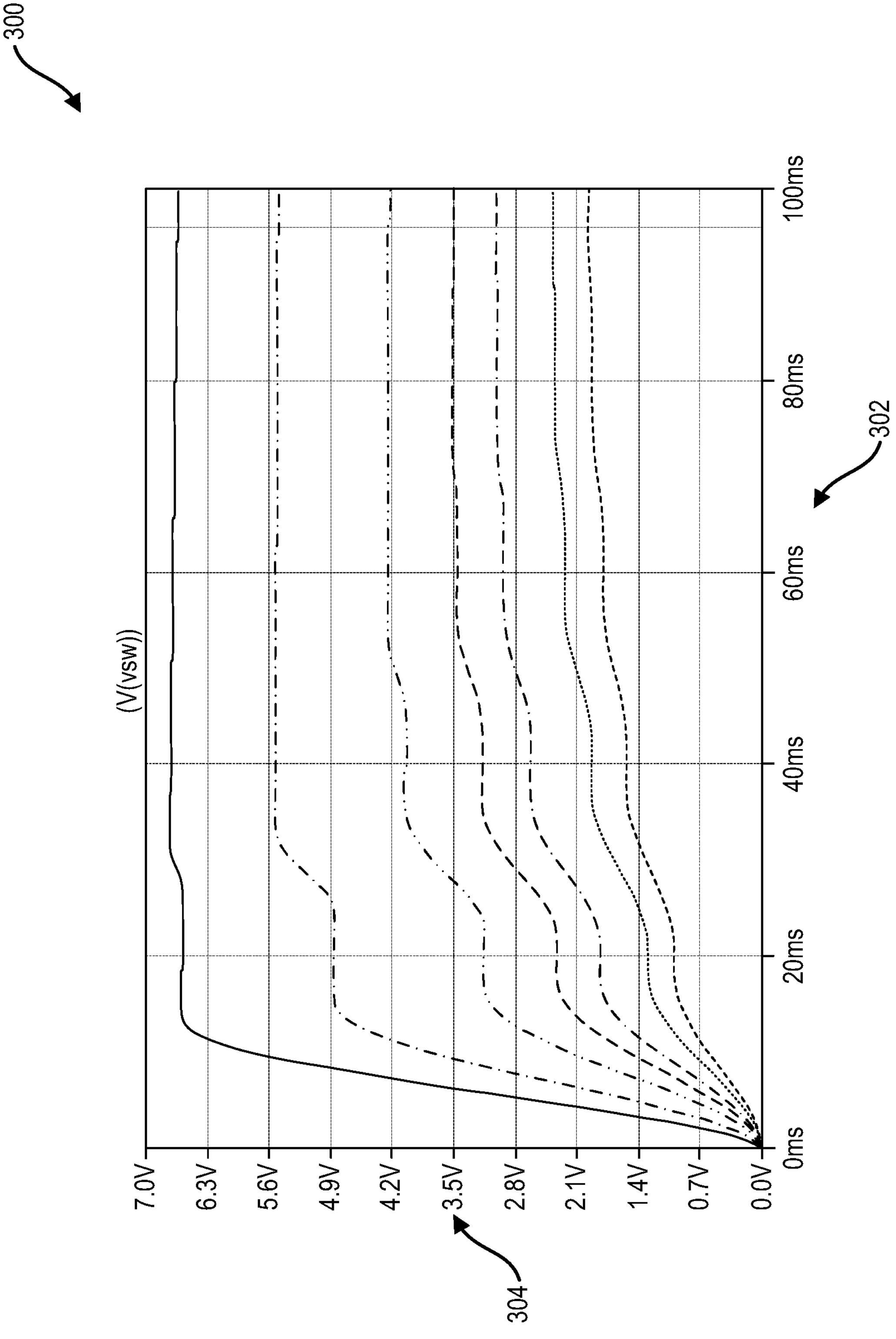
FIG. 3 depicts an example graphical representation that depicts energy stored in a bulk capacitor, according to some aspects described and illustrated herein.

FIG. 3 depicts an example graphical representation 300 that depicts energy stored in a bulk capacitor. The example graphical representation 300 includes an x-axis that corresponds to time values 302 and a y-axis that corresponds to voltage values 304. It is noted that the energy stored in the bulk capacitor is limited by the falling source voltage relative to the rising capacitor voltage. It is noted that a particular problem associated with the above described techniques, namely the techniques corresponding to the figures illustrated in FIGS. 1-3, is that there can be a mismatch between the inductive source voltage profile, the capacitive load profile, and the parasitic resistance. In aspects, the source voltage can decrease as the load voltage increases, thereby resulting in a significant proportion of the source energy being unrecoverable. Further, when the source voltage is high and the capacitor voltage is low, large currents can flow through a device (e.g., a device that includes a capacitor and a buck-boost regulator). Consequently, power can be dissipated in the parasitic resistance, which can in turn result in the inefficient extraction of energy from a mechanical resonator.

In aspects, the use of a buck-boost or a single-ended primary inductor converters ("SEPIC") (a type of DC to DC converter), or AC to DC converters provide improved efficiency. However, these devices also suffer from various disadvantages. For example, these converters provide an efficiency of over 90% for steady state operation near a suitable voltage ratio of the input to the output. However, the efficiency of 90% reduces significantly for values above and below this ratio. In particular, the efficiency value is negligible (e.g., approaches a value of approximately 0) below the undervoltage lockout of the DC to DC controller. In aspects, while the use of piezoelectric transducers having relatively high resonant frequency with relatively short null widths and widely ranging voltages also help mitigate some of the above described problems, the use of piezoelectric transducers is only a partial solution. The techniques described above can result in signals that have an initial rise time and a long decay from a maximum voltage to a value of zero. As such, all of the above described techniques are, at best, partial and imperfect solutions.

Figure 4:
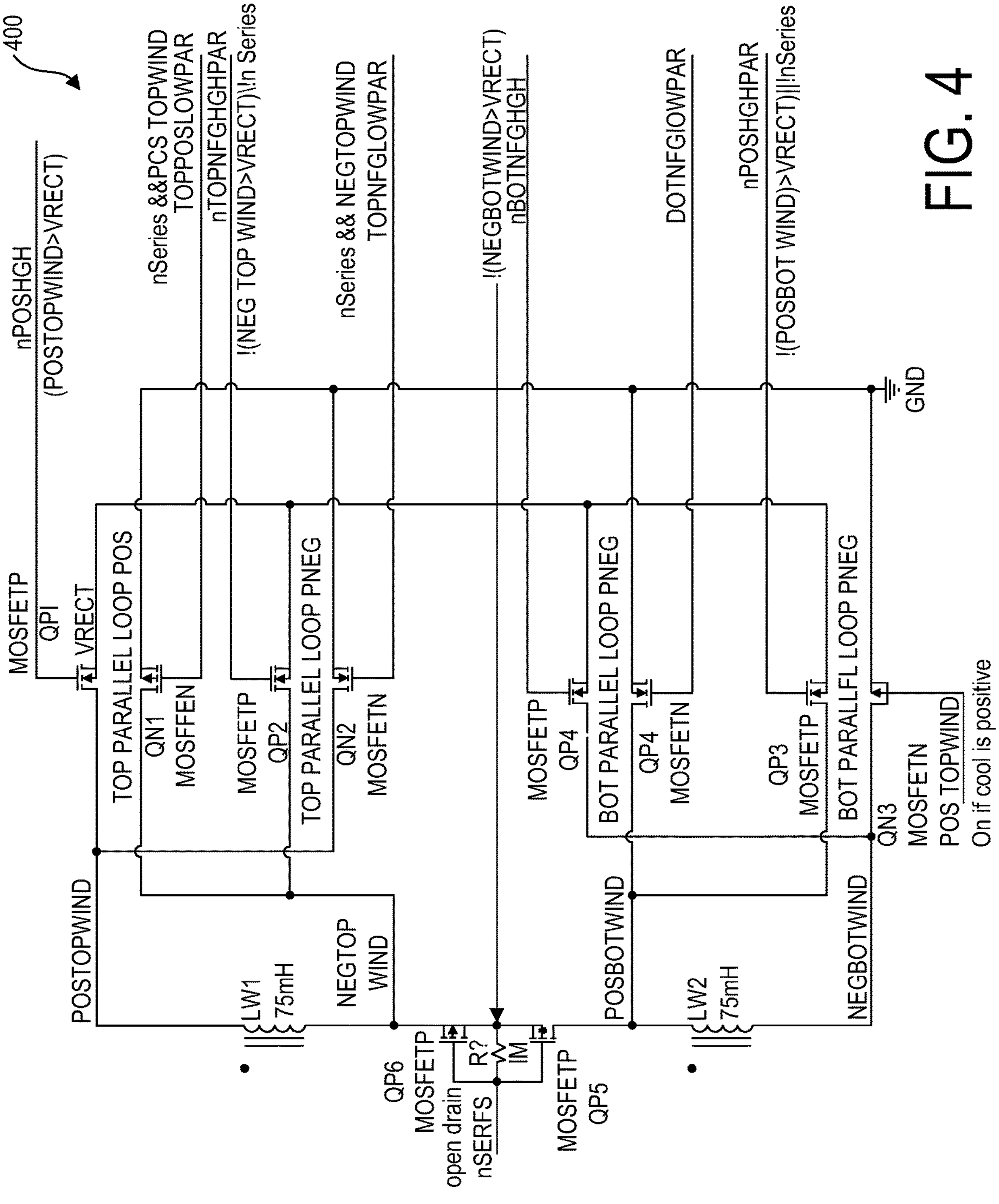
FIG. 4 depicts an example circuit representation of a component included as part of the improved energy harvester of the present disclosure, according to some aspects described and illustrated herein.

FIG. 4 depicts an example circuit representation 400 of a component included as part of the improved energy harvester of the present disclosure. In aspects, it is noted that in most inductive sources, the output voltage and the parasitic resistance can scale with or match the winding inductance. In aspects, with the use of a plurality of windings (represented by term "N"), each with $1/N^{th}$ the inductance and resistance, it can be possible to switch or modify the connection of the windings from a series configuration to a parallel configuration and back from the parallel configuration to the series configuration, in particular, as the voltage exceeds or falls below a particular set of threshold values. A manner of operating the circuit can be used to maintain the winding voltage within the operating range of a DC to DC converter for a larger proportion of the waveform and to maintain the voltage closer to a suitable voltage.

Additionally, in order to avoid high currents during switching operations, each element of the circuit corresponding to the example circuit representation 400 can be designed to have the same stored energy and inductance. As such, the arrangements can be designed to have N elements in $I_{series} \times J_{parallel}$ arrangements or configurations such that I and J are factors of N and I/J is a numerical rating that is representative of a degree of connectedness of the circuit in series. In aspects, if the element inductance is $L_o$, the array inductance is $IL_o/J$ and the connectedness serves as a scaling ratio of inductance at constant stored energy. In aspects, circuit losses due to the interruption of a current in the inductor by relatively slow FET switches favors commutating the switches at the peaks of voltage. Such a peak value of voltage can be represented by "V=Ldi/dt." The value of "V" is at maximum when the stored energy of the inductive elements is zero. In aspects, fast switches can also operate to efficiently commutate the currents while maintaining the switching losses to small values, which is advantages because it reduces instances of voltage variations.

In aspects, such a parallel connection can reduce the range of the voltage from the rectifier since the series combination can offer a higher voltage at lower load currents while the parallel combination can allow for higher current when the load voltage is low. It is noted that parallel combinations can be used when the individual winding voltage is high and series combinations can be utilized when the individual winding voltage is low. As such, the range of the voltage can be reduced. Since both inductors have continuity of I and dI/dt through a fast switching event, the losses can be maintained to the transitional resistance of the switch and a time duration. In aspects, additional details of the circuit configuration as described in the present disclosure are provided in the following paragraphs.

In an aspect, a circuit configuration can be implemented to include two windings having states of connectedness corresponding to $2L_o$ and $0.5L_o$. Further, the circuit configuration can include a p-channel FET having a high side switch that is closed for series connection and open for parallel connection while an additional 4 p-channel Field Effect Transistor ("FET") and 4 n-channel FET, which form a commutated bridge rectifier. While the example circuit ignores the potential backflow of currents from a load, this can be addressed by one or more comparators that control the p-channel FETs. In aspects, if the series connection switch is open, then the parallel enabling of pairs of FETs accomplishes the parallel connectivity. It is possible to obtain a third, $L_o$, state by disabling one of the two windings and extracting energy from only one of the two coupled winding inductors. Alternately, in aspects, a charge pump gate driver and n-channel FET can be used if the lower Ras or drain source on resistance of the n-channel FET outweighs the losses of the charge pump.

In aspects, in operation, by connecting a resistance of a particularly high value between the positive terminals of the two windings and another resistance between the negative terminals of the two windings, the potential relative to positive terminals of the two windings and the negative terminals of the windings can be established. Further, commutation and rectification can be accomplished with the use of 8 Schottky diodes and the p-channel FET series switch. In aspects, in series, the FET being in the ON state can overrule the resistors and be accompanied by a small loss of conductor current. Further, the diodes in the inner windings can never be forward biased in this state. In aspects, while FETs are in an open position, the resistors can make the winding terminal potentials track and all appropriate diodes conduct. In aspects, a combination of diodes in parallel with comparator-driven FETs offers a desirable efficiency and early onset of useful power.

In aspects, an implementation of the winding switches could be further simplified. In particular, in aspects, the simplification can involve the individual rectification of the windings such that the polarity of the windings is identified and known. However, such a scenario results in a doubling of the rectification losses of the series combination in the circuit, which in turn negates the desired outcome of increasing the output voltage relative to the diode voltage drops or MOSFET turn-on voltages. In aspects, the windings are individually rectified such that the polarity is known. In such a scenario, the rectification losses of the series combination could be increased (e.g., doubled). In aspects, losses in a bridge rectifier can be reduced if a MOSFET bridge is utilized. In aspects, it is noted that back current can be avoided. In such a scenario, it can be possible to control the FET states with the use of active bridge controls.

Figure 5:
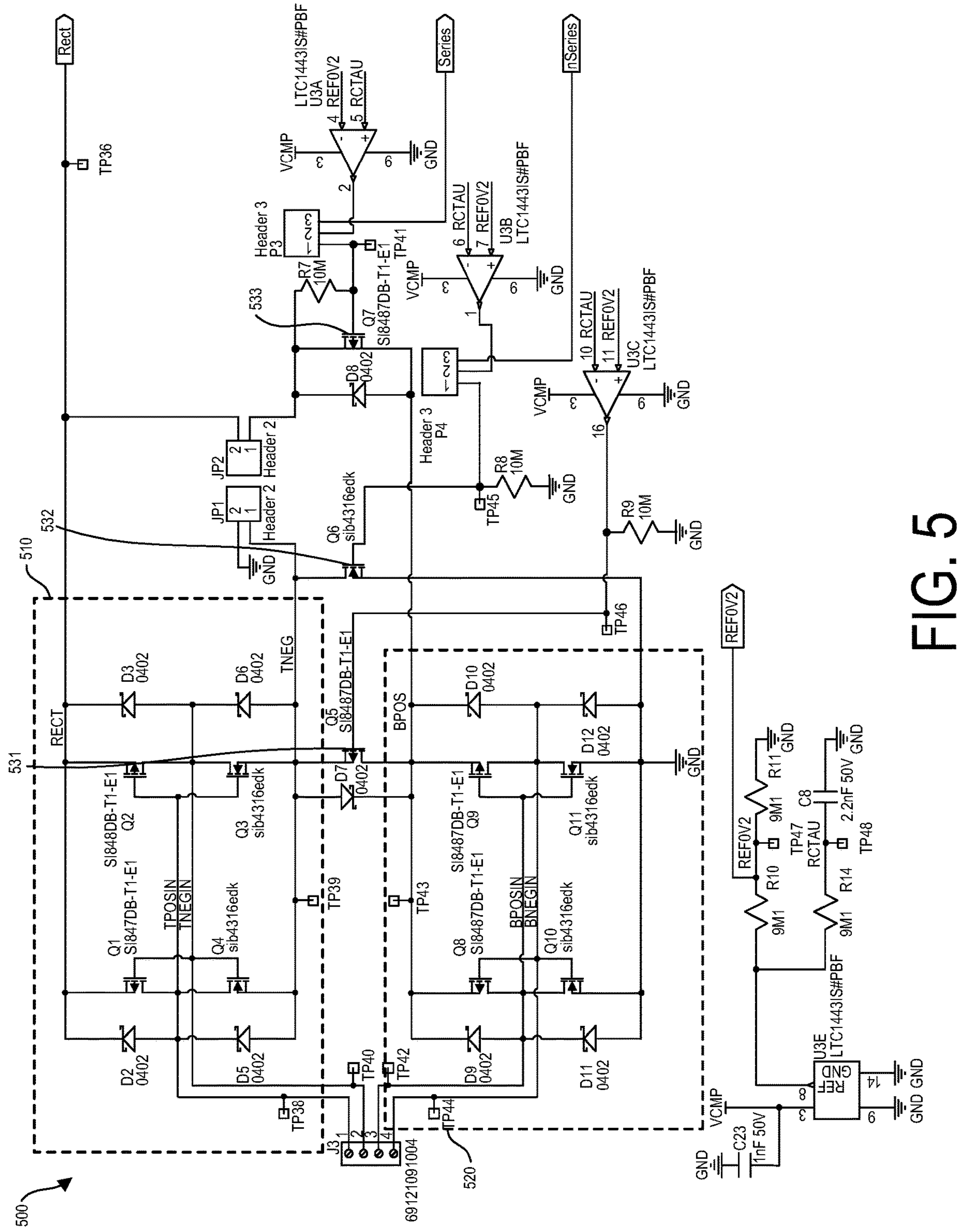
FIG. 5 shows an example circuit having two identical rectification blocks, according to some aspects described and illustrated herein.

FIG. 5 shows such an example circuit 500 having two identical rectification blocks 510 and 520. In aspects, closing FET Q5 531 while opening FETs Q6 532 and Q7 533 creates a series combination. In contrast, flipping the FET states creates a parallel combination. Such an approach allows recursion of the DC commutation for arrays of $2^m$ windings with m+1 states.

Figure 6:
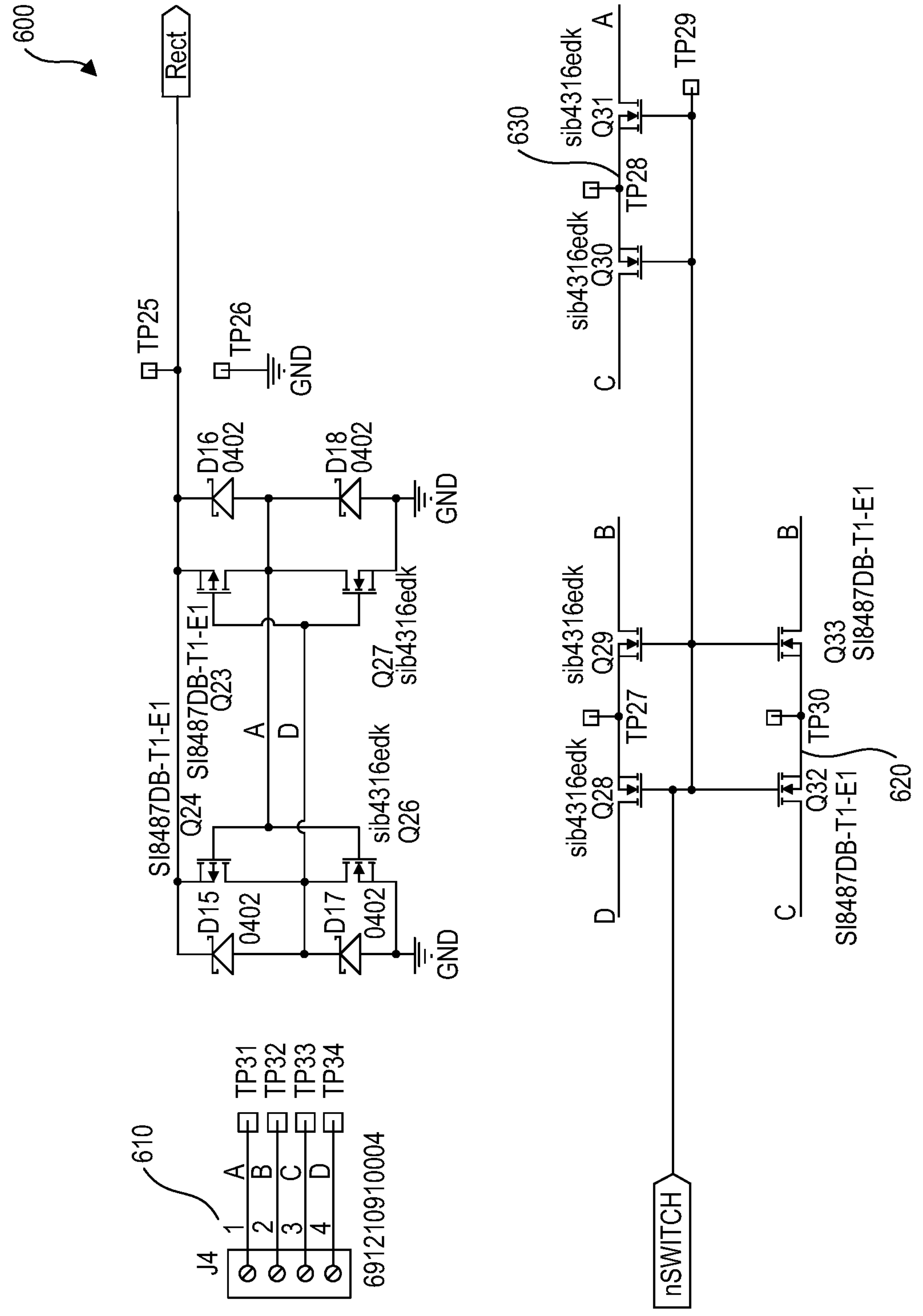
FIG. 6 shows an example circuit with windings feeding connectors such that a first winding connects A and B and a second winding connects C and D, according to some aspects described and illustrated herein.

In aspects, two windings can be AC commutated to series or parallel and the array can be rectified. FIG. 6 shows such a circuit 600 with windings feeding connector 610 such that a first winding connects A and B and a second winding connects C and D. Series connection closes the FETs in commutation circuits 620 and opens the FETs in parallel commutation 630. The parallel state is attained by reversing the FET states. This approach allows recursion of the AC commutation for arrays of $2^m$ windings with m+1 states. In this example, each simplified FET in series and parallel commutation circuits 620 and 630, respectively, of the diagram requires at least back to back FETs to commutate the AC waveform. Additionally separate gate drivers can be needed for P and N-FET operation over the entire AC voltage range.

In other aspects, a configuration of four windings can be utilized. For example, the configuration can include an arrangement of 1×4, 2×2, or 4×1 windings that provide three states. Alternatively, five states can be provided if some of the windings are disconnected. In aspects, the use of twelve windings can enable creation of the following states: 1×12, 2×6, 3×4, 4×3, 6×2, and 12×1. The progression across the various states can be characterized as less series-connected to more series-connected based on the numerical ranking of the number of elements in series divided by the number of elements in parallel. In aspects, the upper bound on the number of windings and the number of states can be limited by the reproducibility of the winding inductances and mutual couplings over an ensemble of windings and by the switch implementations and losses relative to the improved efficiency of the system. Another aspect can employ a single matched group of windings consisting of N-conductor wire to make N nearly identical windings. And, another aspect can employ bifilar winding for a two-winding system with nearly identical inductance and high mutual coupling.

In aspects, by beginning at zero volts in a series combination, a particular forward voltage (e.g., a minimum forward voltage) can be rapidly met, both in the rectifier and in the subsequent stages. Moreover, control logic can be bootstrapped or operated from a quick rise in voltage. In other words, the control logic that is implemented and accessible using, e.g., a microcontroller disposed as part of a chip installed in a device, can be initiated (started) and operated from this quick rise in voltage. As higher current becomes necessary, the high source resistance of the series connection can be undesirable. Further, the series connected voltage may not be desirable for suitable operation or may exceed the ratings of associated components. In aspects, a less-series-connected arrangement can reduce the voltage and allow current to be drawn more efficiently from a lower impedance source. In aspects, as the waveform of the individual winding reaches a peak and then reduces, the voltage can drop to levels that are no longer optimal for subsequent stages. At this point, a more-series-connected arrangement can provide a higher level of efficiency. In some aspects, even fixed time sequences of connectedness could be desirable. In some aspects, a state machine or microprocessor program can operate to track the ideal operational point.

In aspects, a capacitive source array such as a piezoelectric element array can also be commutated using analogous circuits in which the winding inductors can be replaced by piezoelectric capacitors.

The same principles discussed above for commutation of a source array can apply for a storage capacitor array. In aspects, if a load capacitance value is split or separated in a similar manner, the initial charging can be achieved at a relatively low current value or may attain a faster voltage rise at a given current value by using a series combination of the capacitors. It is further noted, however, that the later stages of charging can occur in parallel at a lower voltage, which can allow the load voltage presented by the capacitors to approximately match the source voltage provided by the windings, e.g., over a large fraction of the waveform. In this way, direct passive charging can be improved.

An example method of arranging switches for a capacitor array uses a recursive parallel and/or series switch with N=2m+1 capacitors where m is the recursion number and m=0 is a single capacitor. Such a recursive control offers m+1 states of array capacitance relative to the element capacitance, $2^{-m}$, $2^{2-m}$, . . . $2^{m-2}$, $2^{m}$ and lacks the finer resolution of a more complicated commutation fabric of switches. However, it allows control of the operational voltage of a charged array within an approximately 2:1 voltage range over a range of charge that is m times wider than the single capacitor. Such an array can feed a DC-DC converter in a more efficient range than the single, fixed capacitor.

Figure 7:
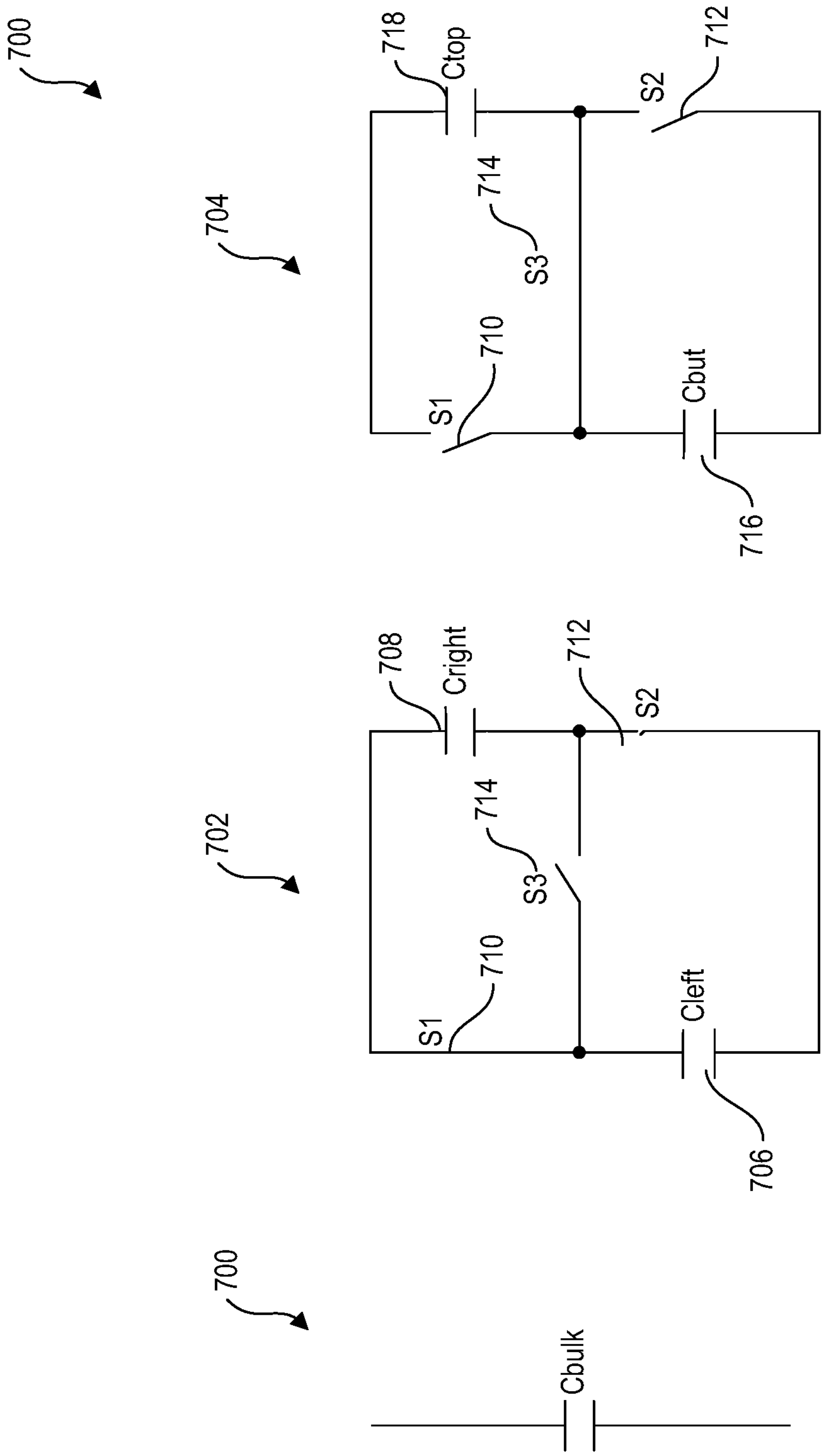
FIG. 7 illustrates a number of circuit arrangements that enable connecting capacitors in series and in parallel, according to some aspects described and illustrated herein.

FIG. 7 illustrates a number of circuit arrangements that enable connecting capacitors in series and in parallel, according to one or more aspects described and illustrated herein. Circuit 700 is a bulk capacitor, while circuit 702 is one that enables connecting two capacitors in series and circuit 704 is one that enables connecting two capacitors in parallel. Regarding circuit 702, a first capacitor 706 is connected to a second capacitor 708 when first and second switches 710 and 712 are turned on and the third switch 714 is turned off. In contrast, in circuit 704, the third capacitor 716 and the fourth capacitor 718 can be connected in series if the first and second switches 710 and 712 are turned off and third switch 714 is turned on.

Figure 8:
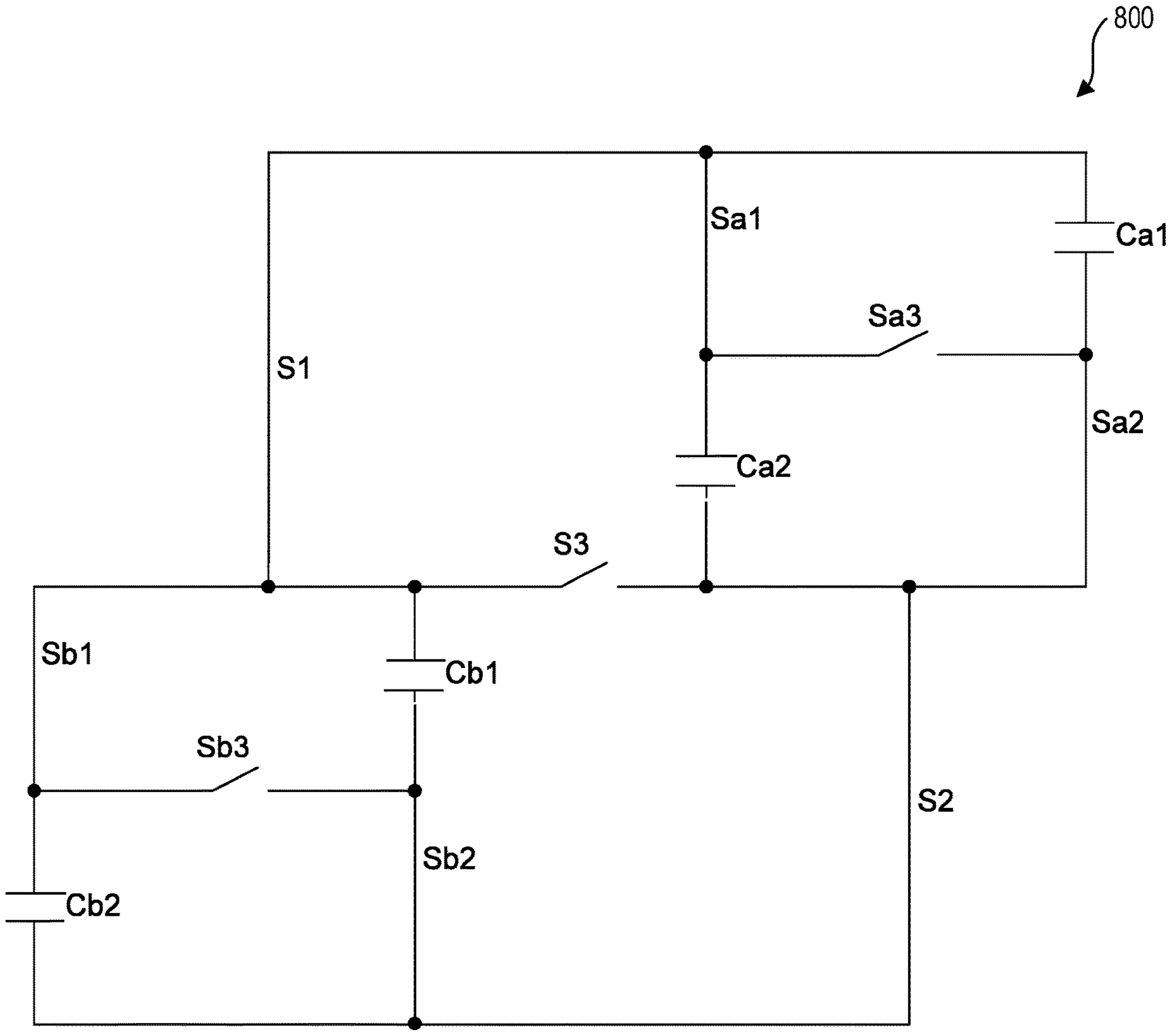
FIG. 8 illustrates a recursively configured higher order circuit, in which the two capacitors as depicted in FIG. 7 are replaced with capacitors of lower value and a set of six switches, according to some aspects described and illustrated herein.
Figure 11:
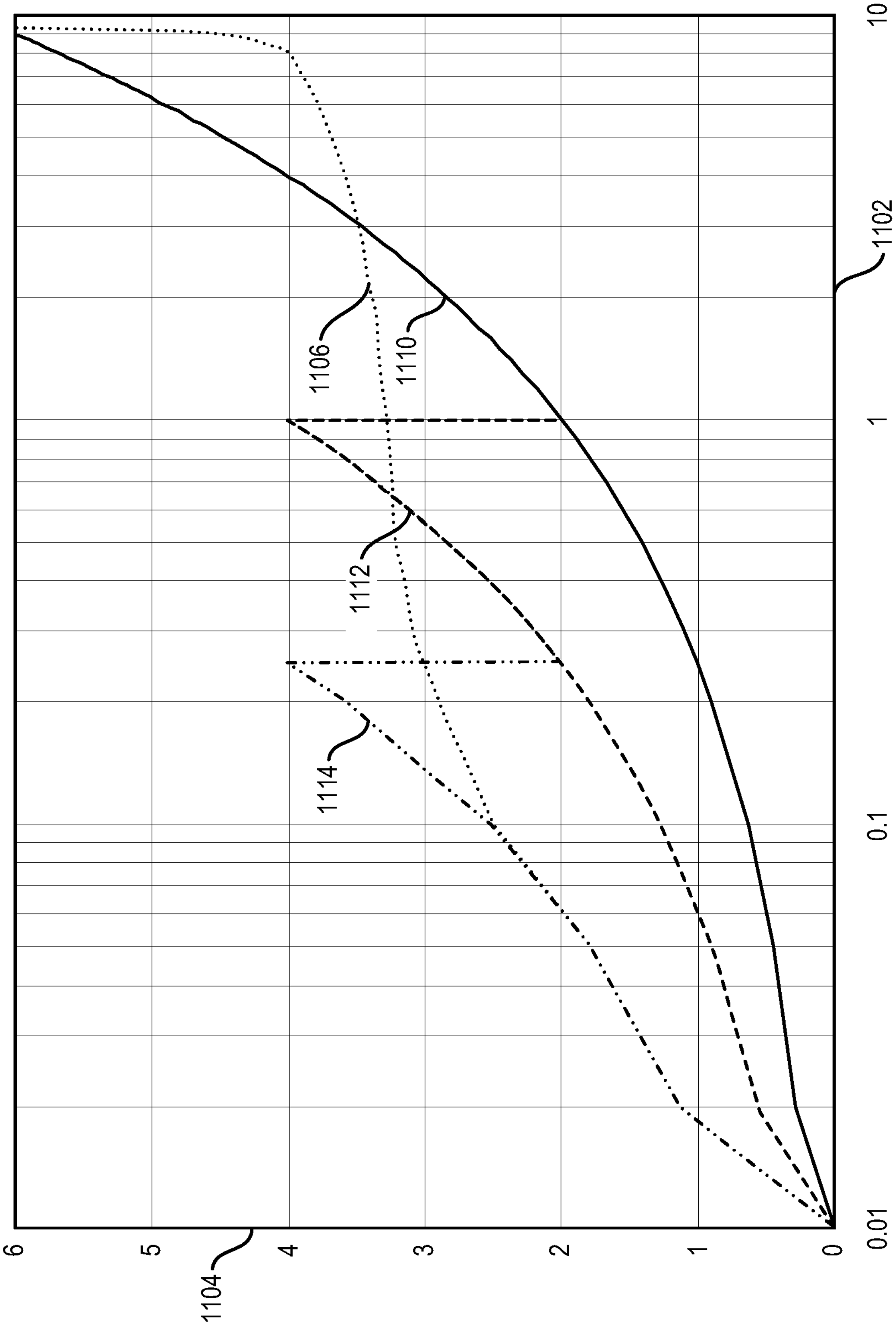
FIG. 11 depicts an example graphical representation that includes voltage characteristics of various traditional devices relative to the voltage characteristics of a device that utilizes the capacitor matrix or capacitor configuration as described in the present disclosure, according to some aspects described and illustrated herein.

FIG. 8 illustrates a recursively configured higher order circuit 800, in which the two capacitors as depicted in FIG. 7 are replaced with capacitors of lower value and a set of six switches. Such a recursively configured higher order circuit (second-order switching matrix) has the voltage characteristics of the curve as illustrated in FIG. 11 and described later on in the present disclosure.

Figure 9:
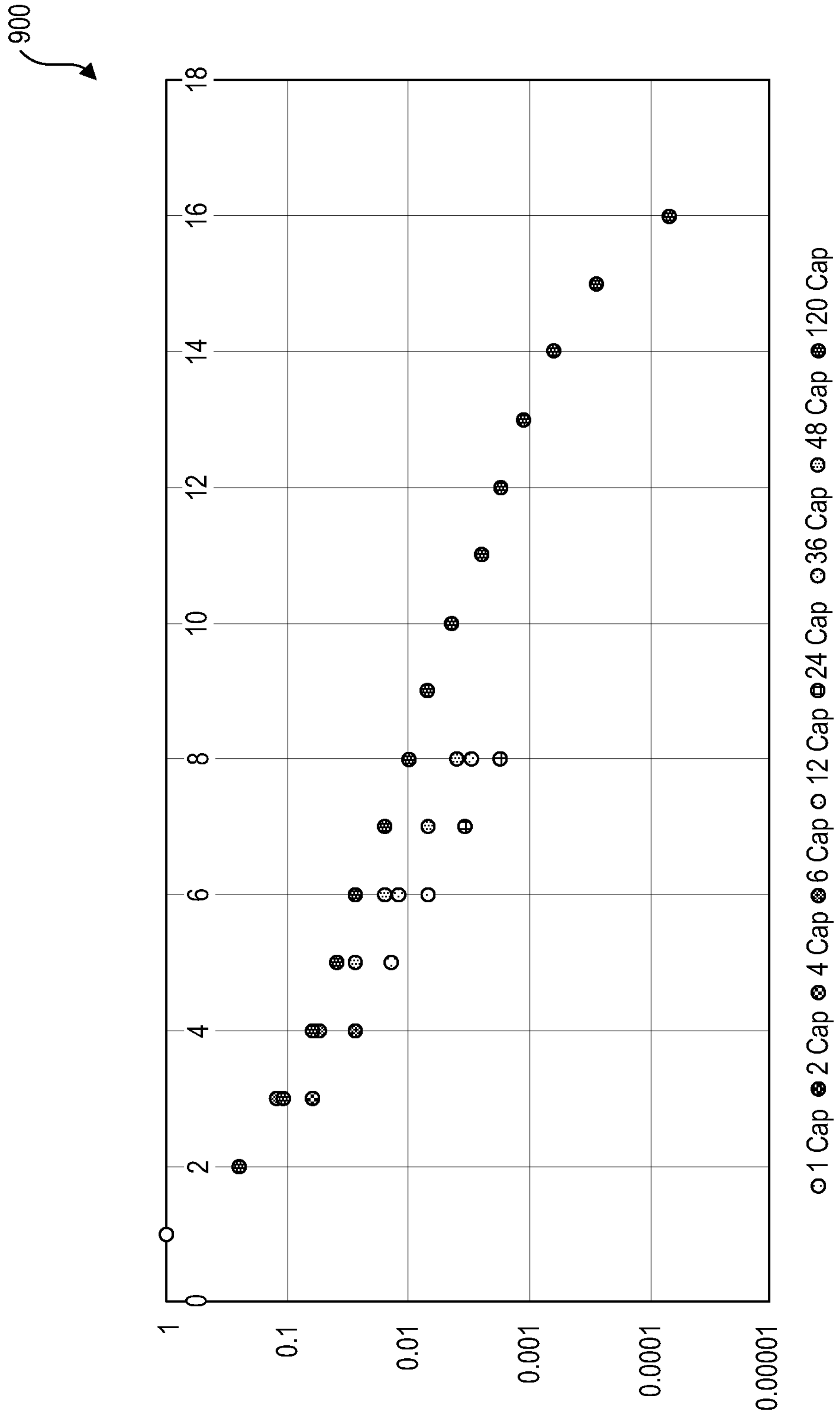
FIG. 9 depicts an example graphical representation of normalized capacitance values over a fully parallel configuration for various array sizes, according to some aspects described and illustrated herein.

FIG. 9 depicts an example graphical representation 900 of normalized capacitance values over a fully parallel configuration for various array sizes. For example, with respect to the example graphical representation 900, there can be two approaches that can be utilized for the purpose of fabricating a digitally tunable capacitor. In aspects, an array of ceramic capacitors (e.g., N capacitors) can be printed on a substrate with $2^{N}$ pads, with each pad having stud bumps or other wafer to wafer MEMS bonding components. In aspects, the inner area of an integrated circuit can have matching pads to which the capacitor array can be bonded and can have outer pads wire bonded to external leads of the package. In other aspects, an array of micro supercapacitors can be printed directly onto the semiconductor controller, e.g., in a monolithic solution.

In aspects, it is noted that capacitor switching threshold values can be chosen based on the ratings of the individual capacitors or by the power needs of a subsequent associated circuit. Control logic can function to divide the array into subsections for the purpose of forming an adjustable ratio charge pump. Additionally, the control logic can also operate to monitor the net capacitance of the element and adjust I/J to maintain a near constant voltage as energy is added to or removed from the system. Moreover, unlike switched capacitors and charge pumps, a charge may not be commutated from one element to another and the array of I×J capacitors will have a capacitance of $IC_o/J$ with an equivalent series resistance of $I/J*(ESR_{cap}+R_{ds\_switch})$. In short, such an aspect corresponds to a digitally-controlled, solid state battery.

Figure 10:
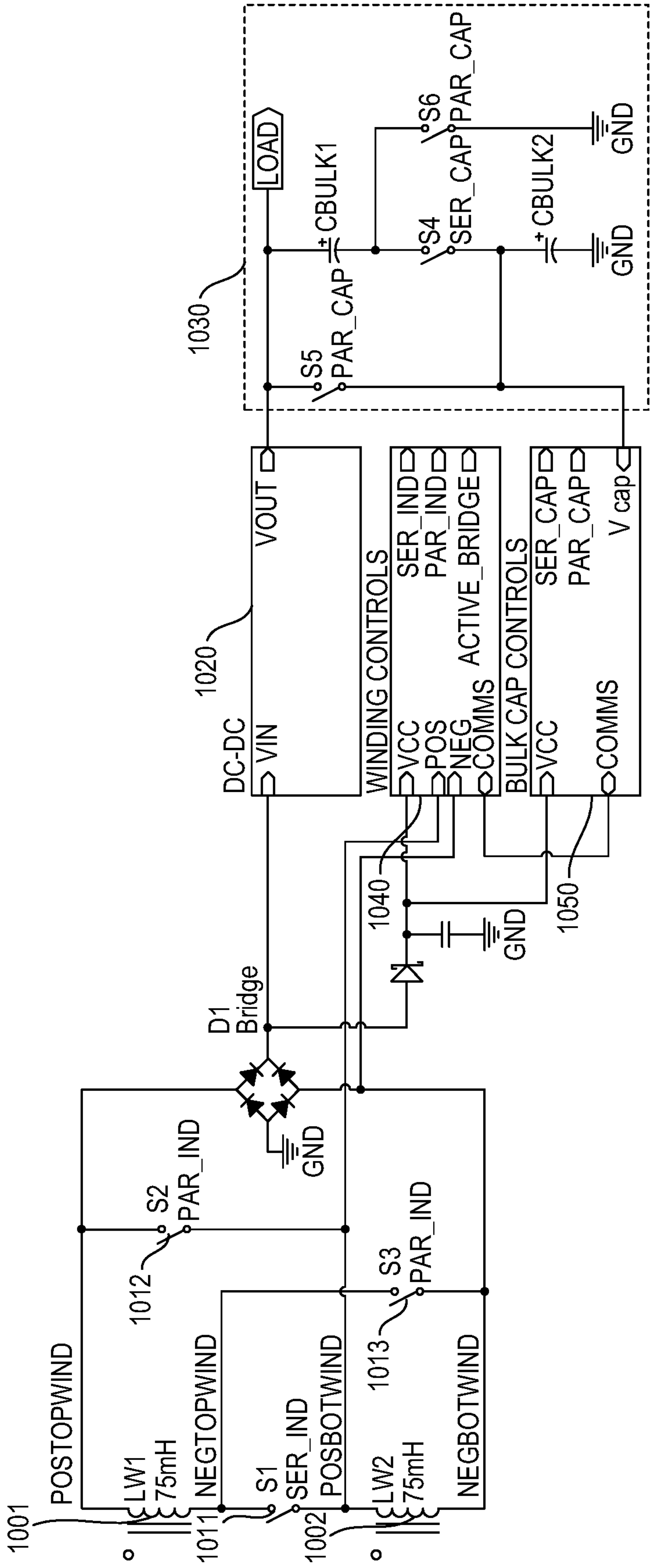
FIG. 10 depicts an example circuit configuration in which a plurality of energy harvesting windings can be combined in multiple configurations by switching elements in order to provide an optimal voltage range to a DC to DC converter, according to some aspects described and illustrated herein.

FIG. 10 depicts an example circuit configuration 1000 in which a plurality of energy harvesting windings 1001 and 1002 can be combined in multiple configurations by switching elements 1011, 1012, and 1013 in order to provide an optimal voltage range to a DC to DC converter 1020. In aspects, such a DC to DC converter can charge a digitally controlled capacitor 1030. In aspects, a winding configuration controls 1040 can be controlled solely by the voltages of the windings. Further, in aspects, the capacitor configuration controls 1050 can be controlled solely by the voltages of the capacitors. In other aspects, the control mechanisms can operate such that the ratio of $V_{IN}/V_{OUT}$ for the DC-DC converter can be controlled such that the device's operating efficiency is improved. In aspects, such an example harvester could be input into a second DC/DC regulator with a sufficiently fine adjustment of the capacitor. The capacitor can maintain a constant voltage up to its maximum charge and the windings can be adjusted to optimally feed the capacitor.

In aspects, DC-DC converters can include buck-boost and SEPIC converters, and/or other comparable converters. In other aspects, all of the winding switching and the active rectification can be merged into the power converter. In aspects, once a capacitor is charged, an objective can be to utilize the charged capacitor to supply charge to a circuit. In aspects, a 330 μF capacitor can be charged to, by way of a nonlimiting example, 4.92 V (4 mJ). This charge can then be utilized to supply a current in the amount of 25 mA to a 2 V load via the use of a buck-boost converter having an average efficiency of 83.3%. It is noted that there can be a drain on the capacitor in the amount of 60 mW. In particular, in aspects, the capacitor voltage could drop through the optimum voltage until it reaches the drop out voltage of the converter. In aspects, assuming lower voltage limit of 1 V, approximately 0.165 mJ of energy can remain on the capacitor and the circuit can be powered for a time frame of almost 64 ms. In another aspect, an energy amount remaining on the capacitor can represent another 2.75 ms of operation. In aspects, losses in the percentage of the 16.7% in a converter (668 μJ) can represent another 16.7 ms of operation time during which the circuit can operate with ideal conversion.

In aspects, a steady state and transient efficiency of a particular buck-boost regulator (e.g., represented by ISL9122A) was evaluated. Using the steady state efficiency relative to an input voltage from a 4 mJ charge on a 330 μF capacitor, the buck-boost regulator was able to supply 2.875 mJ to a load without switching, which corresponds to an average efficiency level of 71.9%. Additionally, in aspects, using four 165 μF capacitors in 660 μF/165 μF/21.5 μF configurations, the same 4 mJ input provided 3.4 mJ to a load without switching, which corresponds to a load of 18.2%. Such improvements in percentages can be achieved due to the rearranging of elements to a more series connected state. A brief description of Table 1, provided below, is instructive.

TABLE 1

| Eo | Vin | eff | dE | dEin | Eo | Vin | eff | dE | dEin |
|---|---|---|---|---|---|---|---|---|---|
| 4 | 4.92366 | 0.763 | 0.25 | 0.327654 | 4 | 3.481553 | 0.829 | 0.25 | 0.301568 |
| 3.672346 | 4.717695 | 0.774 | 0.25 | 0.322997 | 3.698432 | 3.347741 | 0.84 | 0.25 | 0.297619 |
| 3.349349 | 4.50545 | 0.785 | 0.25 | 0.318471 | 3.400813 | 3.210217 | 0.848 | 0.25 | 0.294811 |
| 3.030877 | 4.285902 | 0.796 | 0.25 | 0.31407 | 3.106001 | 3.067919 | 0.853 | 0.25 | 0.293083 |
| 2.716807 | 4.05777 | 0.807 | 0.25 | 0.309789 | 2.812918 | 2.919588 | 0.853 | 0.25 | 0.293083 |
| 2.407018 | 3.819422 | 0.812 | 0.25 | 0.307882 | 2.519835 | 2.763307 | 0.868 | 0.25 | 0.288018 |
| 2.099136 | 3.566796 | 0.829 | 0.25 | 0.301568 | 2.231817 | 2.600592 | 0.88 | 0.25 | 0.284091 |
| 1.797568 | 3.300659 | 0.84 | 0.25 | 0.297619 | 1.947726 | 2.429444 | 0.89 | 0.25 | 0.280899 |
| 1.499949 | 3.015062 | 0.853 | 0.25 | 0.293083 | 1.666827 | 2.247441 | 0.91 | 0.25 | 0.274725 |
| 1.206865 | 2.704503 | 0.868 | 0.25 | 0.288018 | 1.392102 | 2.053896 | 0.929 | 0.25 | 0.269107 |
| 0.918847 | 2.359824 | 0.9 | 0.25 | 0.277778 | 1.122995 | 3.689453 | 0.83 | 0.25 | 0.301205 |
| 0.641069 | 1.971108 | 0.929 | 0.125 | 0.134553 | 0.82179 | 3.15612 | 0.85 | 0.25 | 0.294118 |
| 0.506516 | 1.752082 | | | | 0.527672 | 2.529037 | 0.868 | 0.25 | 0.288018 |
| 0.506516 | 1.752082 | | | | 0.239654 | 3.408752 | 0.848 | 0.1 | 0.117925 |
| 0.506516 | 1.752082 | | | | 0.12173 | 2.429411 | 0.875 | 0.05 | 0.057143 |
| | | | | | 0.064587 | 1.769597 | | | |
| | | | 2.875 | | | | | 3.4 | |

Table 1 above shows voltage values relative to energy consumption for a buck-boost regulator represented by ISL9122A, in which a 4 mJ input is fixed relative to a 330 µF capacitor and a switched four element 165 µF capacitor array. As shown in the table, there is an 18% improvement in the amount of energy that is extracted. As such, it is noted that while ideal conversion may not happen, reshuffling the energy from a parallel configuration at full charge to a series configuration at full depletion can result in a desirable improvement in efficiency. In such a scenario, an amount of energy remaining on the capacitors can be negligible. Further, the capacitor voltage can be maintained within a range closer to the optimum input voltage of the subsequent power supply, improving the average efficiency. In short, using the above described techniques, devices, and configurations, an average efficiency of 91.6% can be maintained, which results in the reduction of the conversion losses by 50%. Further, using the techniques described herein, an additional on air time of 8 ms can be obtained from, e.g., a low power radio circuit.

FIG. 11 depicts an example graphical representation 1100 that includes voltage characteristics of various traditional devices relative to the voltage characteristics of a device that utilizes the capacitor matrix or capacitor configuration as described in the present disclosure, according to one or more aspects described and illustrated herein. In particular, FIG. 11 illustrates a graph with an x-axis that represents a plurality of energy values on a log scale 1102 and a y-axis that represents a plurality of voltage values 1104. The first voltage curve 1106 represents the voltage vs. energy characteristics of a typical battery with a relatively constant (2:1) voltage from 0.06 mJ to 8 mJ. A first curve 1110 illustrates a traditional capacitive device, e.g., a conventional super capacitor, that has a similar voltage range, namely from 1 mJ to 4 mJ. A second curve 1112 shows that the disclosed switching capacitor array, with m=1 and two capacitors, extends the comparable voltage range to approximately 0.25 mJ. A third curve 1114 shows that the disclosed switching capacitor array, with m=2 and four capacitors, extends the comparable voltage range down to 0.25 mJ. Assuming the input of an initial energy and the drawing of a constant amount of power, the voltage characteristics of the super capacitor will present a monotonically declining voltage over time, which rapidly declines below the undervoltage limit of a load circuit. In aspects, in order to counteract and overcome such a deficiency, various techniques can be implemented, including the use of a regulator (e.g., a buck boost regulator). A buck-boost regulator operates to generate a DC output voltage that is larger or smaller than a DC input voltage, and as such, enables for the maintaining of a constant output voltage. However, such a regulator suffers from some deficiencies including, e.g., design and implementation complexity and approximately a 10-20% power loss during conversion.

The capacitor matrix design as described herein addresses and overcomes these deficiencies. Specifically, this design enables for the stabilization of operating voltage over an increased range of the energy state of charge. The stabilization of operating voltage using the capacitor matrix design of the present disclosure is illustrated by the first and second curves 1110 and 1112, which indicate a steady voltage level for a wider range of state of charge. As the recursion order, m, or the number of elements in the switched array, M, increase, the voltage relative to energy curve of the switched capacitor array operates in a manner that is similar to a battery. Additionally, it is noted that the capacitor matrix design does not suffer from the deficiencies associated with batteries having short lifetimes and buck-boost regulators used with a single capacitor.

In aspects, the voltage characteristics illustrated in FIG. 11 can correspond to the voltage behavior of a 500 µF capacitor, which can charge to 4 mJ of energy at a voltage of 4 V. In aspects, such a capacitor can require 1 mJ of energy to attain a voltage level (e.g., 1.8 V) for standard operation of a variety of devices. In aspects, if the 500 µF capacitor operates like a number of smaller capacitors, less overall unusuable energy (wasted energy) is involved in initiating and maintaining operation of a device. The first curve 1110 shows the voltage characteristics of a single (m=0) 500 µF capacitor, while second and third curves 1112, 1114 depict voltage characteristics of, e.g., an array of two (m=1) 250 µF capacitors and four (m=2) 125 µF capacitors, respectively, as part of recursively switched arrays. As a consequence, the voltage characteristics represented by second and third curves 1112 and 1114 indicate a more uniform voltage that can be maintained by a device as opposed to a device with the voltage characteristics represented by the first curve 1110. While the simpler m-recursion approach can have a 2:1 voltage range, adding another unswitched capacitor in parallel can reduce the voltage range. The more general I×J fabric of switches also provides reduced granular voltage relative to energy curves.

Figure 12:
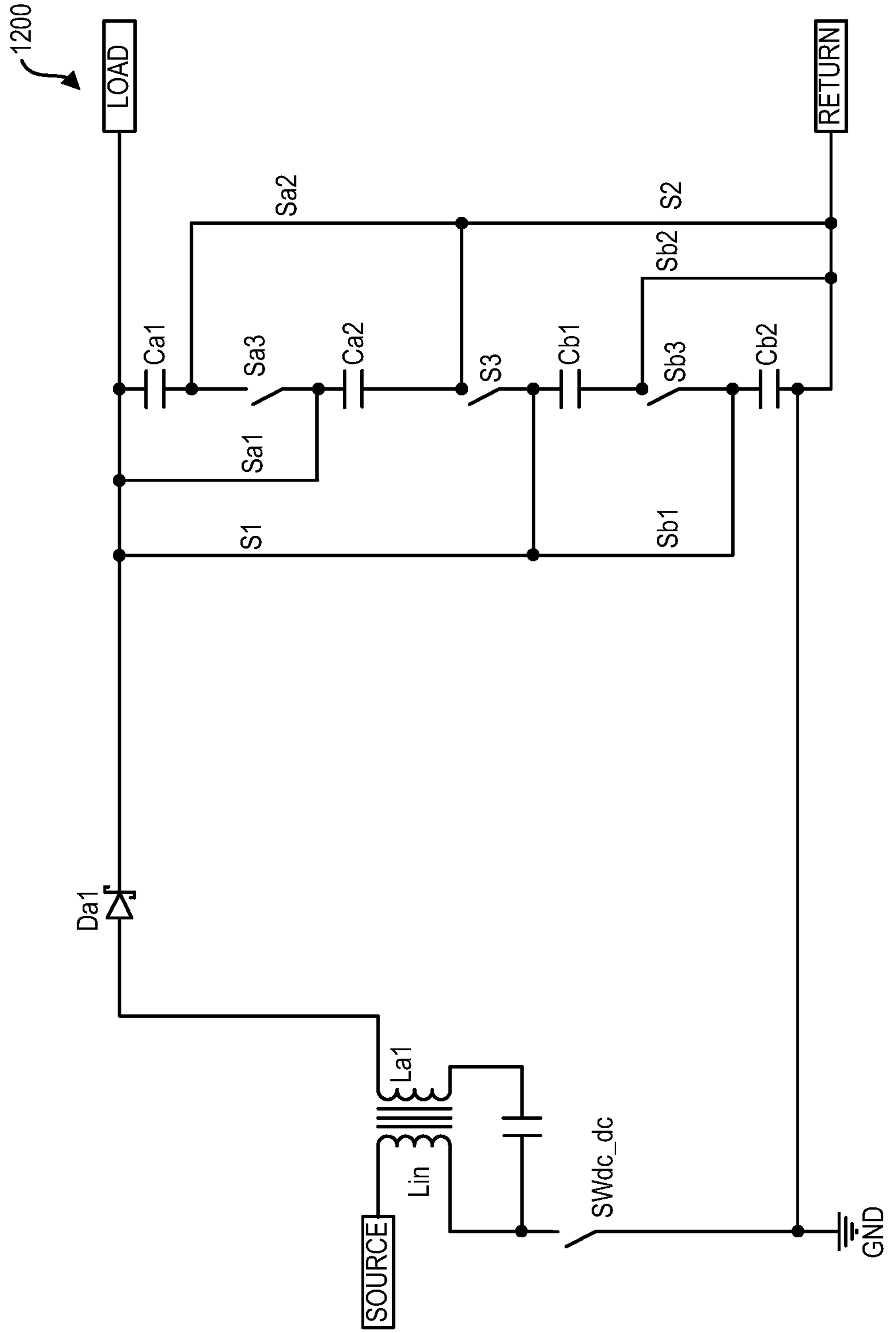
FIG. 12 illustrates a traditional circuit configuration including a single-phase SEPIC DC to DC converter charging an array of four capacitors configured in accordance with aspects described herein.

FIG. 12 illustrates a circuit configuration 1200 in which a single phase DC to DC power converter circuit charges a switched dynamic capacitor. The circuit of FIG. 12 includes a coupled input and output inductor, a diode, capacitors, and a plurality of switches that are configured such that these switches enable the altering of the connection of various capacitors from series and to parallel based on the operating states of the switches. The circuit illustrated in FIG. 12 is representative of a SEPIC topology and has the advantage of the output having a series rectifying element that can prevent discharge of the bulk storage capacitors. Other DC to DC topologies can also have desirable and comparable features. In aspects, while a diode is illustrated, a synchronously switched FET can also improve overall efficiency.

Figure 13:
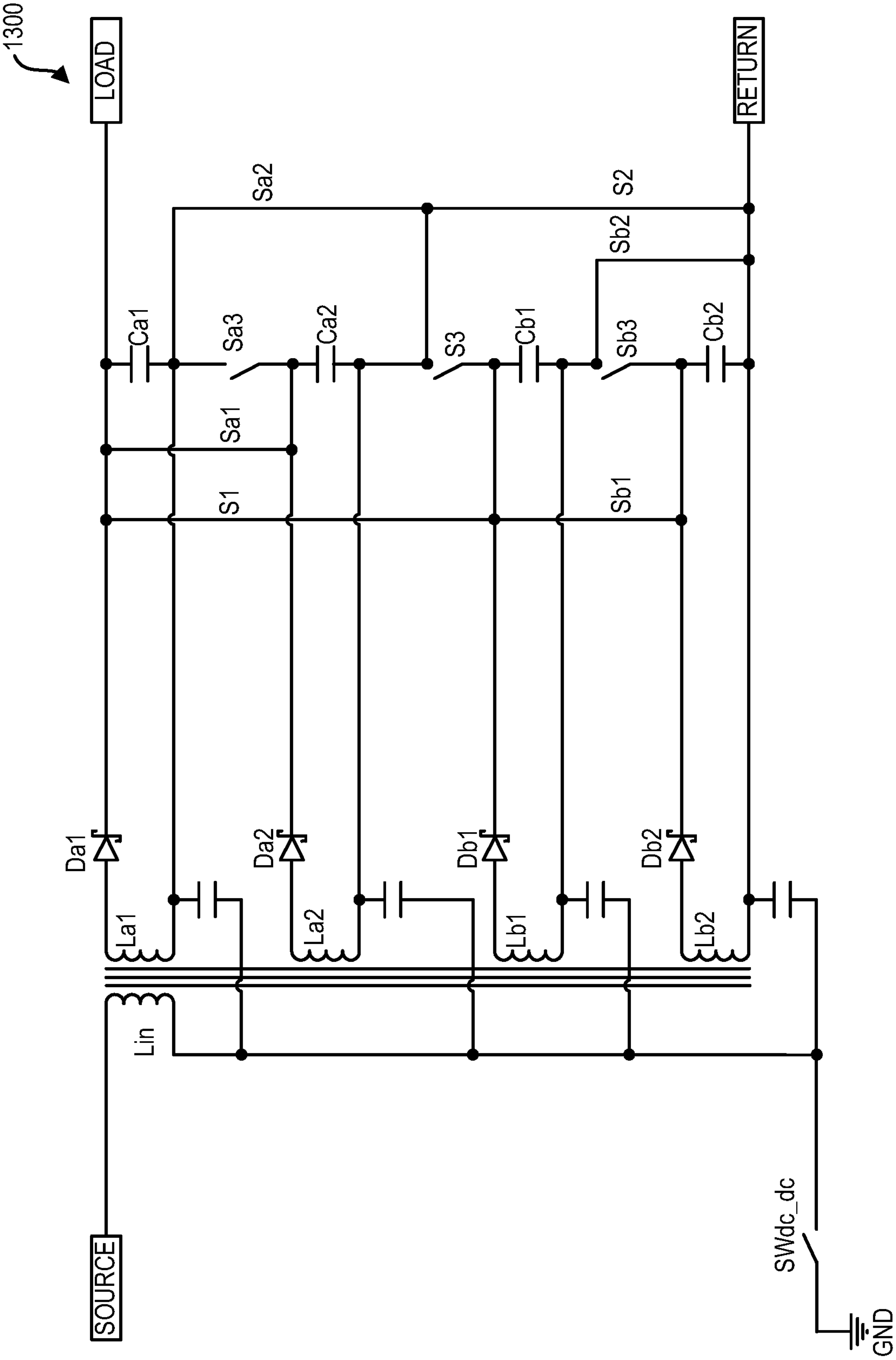
FIG. 13 illustrates a SEPIC DC to DC converter with multiple outputs in which each capacitor of the switchable capacitor array can be electrically connected to a specific output coil and a rectifying diode, according to some aspects described and illustrated herein.

FIG. 13 illustrates a circuit configuration 1300 in which each capacitor of the switchable capacitor array can be electrically connected to a specific output coil and a rectifying diode. It is noted that, in aspects, in the circuit configuration of FIG. 13, all of the phases switch simultaneously from a single input inductor and all of the capacitors approximately simultaneously receive an incremental amount of energy.

Figure 14:
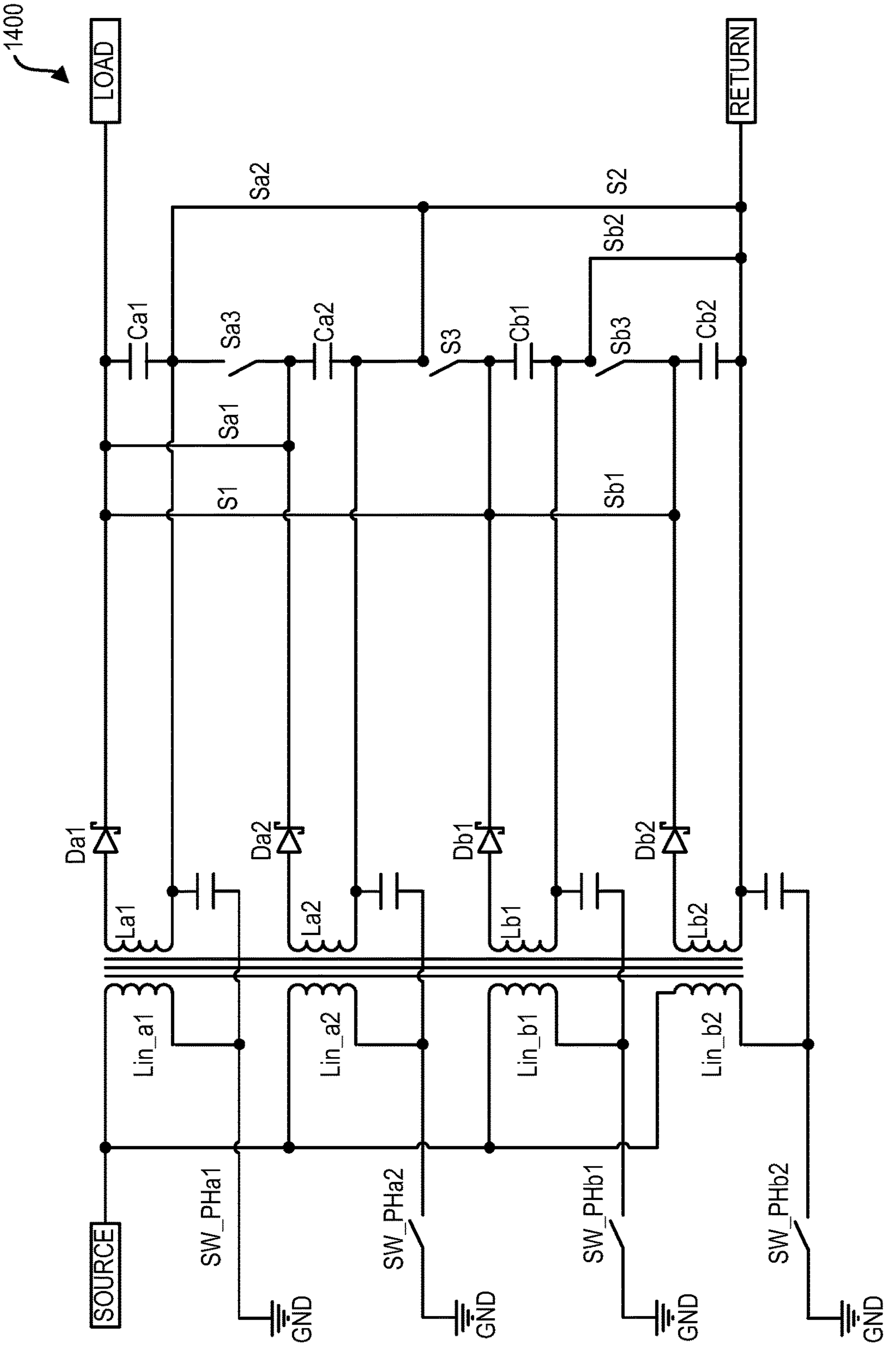
FIG. 14 illustrates a multiple input, multiple output circuit configuration in which each capacitor's charging source is sequentially energized from the input and each capacitor has a specific output coil and diode, according to some aspects described and illustrated herein.

FIG. 14 illustrates a circuit configuration 1400 in which each capacitor's charging source is sequentially energized from the input and each capacitor has a specific output coil and a diode. Such a configuration provides the advantage of more constant source current flow (ripple less or approximately ripple free source current flow). In the circuit configuration 1400, the diodes can be replaced with Field Effect Transistors (FETs). Further, the circuit configuration 1400 can be implemented with respect to a number of capacitors and switches, which facilitate connecting the capacitors in series and parallel connections. It is noted that while the circuit configuration 1400 is an m-stage recursive switch based circuit that connects 2/\m, e.g., four capacitors, any number or array of capacitors can be connected using a different arrangement of switches in order to implement a higher number or lower number of parallel arrangements. For example, in aspects, a 12-capacitor array could be implemented with 6 combinations of parallel and series arrangements, while a 60 capacitor array could be implemented with 12 combinations of parallel and series arrangements.

Figure 15:
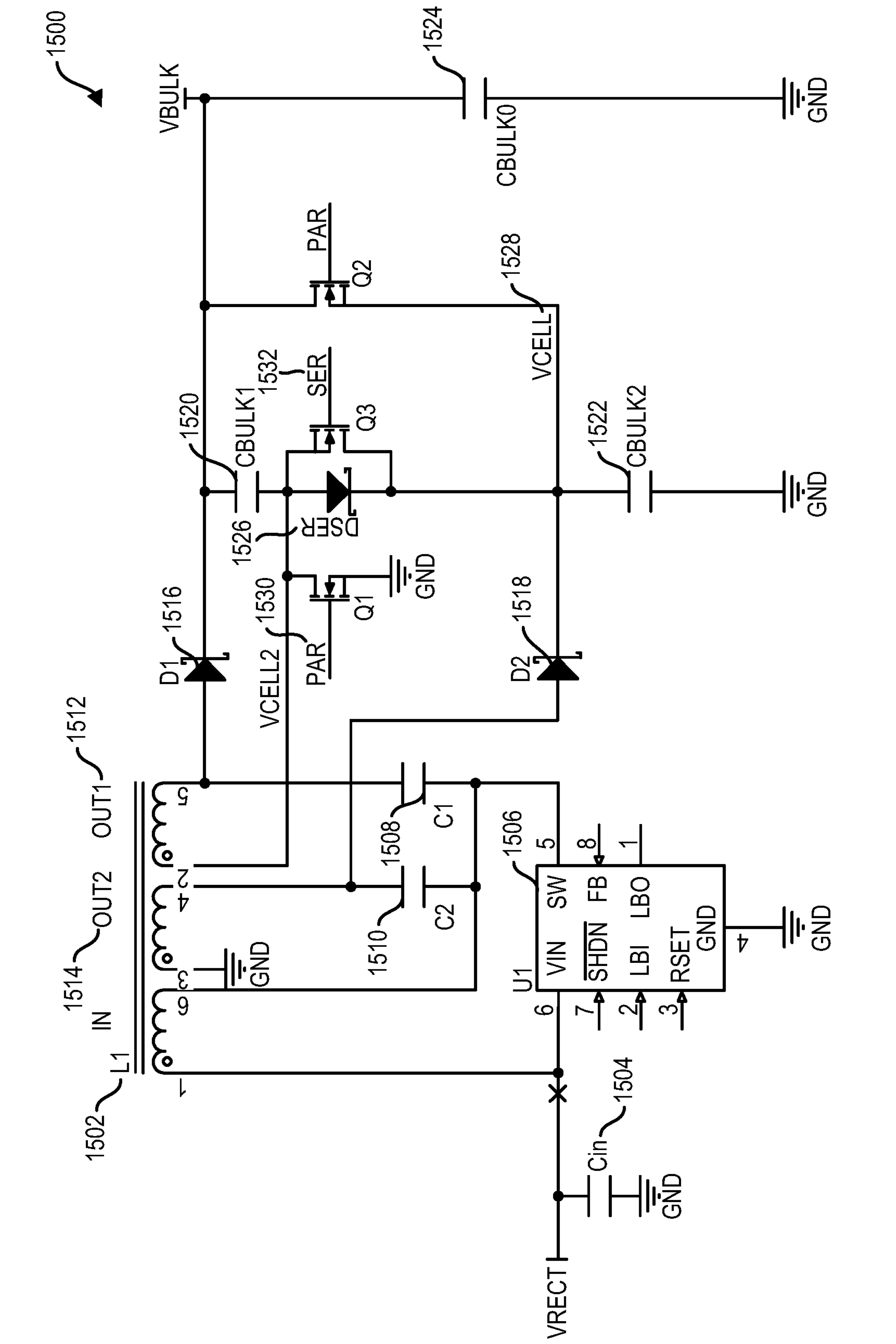
FIG. 15 illustrates a circuit configuration that is based on a single input with two galvanically separate output loops, e.g., at least prior to being interconnected by the switching matrix, according to some aspects described and illustrated herein.

FIG. 15 illustrates a circuit configuration 1500 that is based on two galvanically separate output loops, e.g., at least prior to being interconnected by the switching matrix, according to one or more aspects described and illustrated herein. In particular, as illustrated in FIG. 15, the circuit configuration 1500 includes a plurality of capacitors, inductor, diodes, and FETs. The inductor is a 1:1:1 input inductor 1502 (inductive coil). Further, high switching current spikes of the input inductor 1502 can have efficiency losses in a impedance source. These current transients can be filtered by a particular input capacitor 1504 ($C_{in}$), e.g., a relatively small capacitor. It is noted that slowly varying input currents can charge such a capacitor. Further, these slowly varying input currents are discharged through the input coil of the 1:1:1 input inductor 1502 when the internal switch 1506 is connected to ground. Capacitors 1508 and 1510 provide capacitive coupling of the switched currents into output coils 1512 and 1514 of the inductors, which enables the coupling of the input and output signals and galvanic isolation of the inductors during the energizing phase of the input inductor 1502. It is noted that diodes 1516 and 1518 direct currents to bulk capacitors 1520 and 1522 irrespective of the connected state of these capacitors (e.g., irrespective of whether these capacitors are connected in series or in parallel). In operation, when the internal switch 1506 is in an open state, the magnetic energy stored therein discharges from output coils 1512 and 1514 and is pushed through diodes 1516 and 1518 until complete energy depletion of the coils. In aspects, the addition of unswitched bulk capacitor 1524 operates as a stabilizing component when transients are switched. Further, the addition of the unswitched bulk capacitor 1524 reduces the 2:1 voltage ratio.

In aspects, the bulk capacitors 1520 and 1522 are connected in a series configuration during the charging phase of diode DSER 1526. Additionally, comparators that monitor $V_{CELL}$. 1528 select either PAR 1530 or SER 1532 gate voltage in order to control the connectivity of the bulk capacitors to a load. The circuit configuration 1500 includes numerous advantages, e.g., the ability to rapidly raise output voltage. Other advantages include a simple gate drive circuitry and switching currents and reducing the number of FETs that are involved in the circuit. It is noted that the charging of the bulk capacitors is independent of the FET switches because the charging loops are galvanically isolated, except as connected by the FETs. In aspects, a 5-winding X: 1:1:1:1 coupled inductor in which "X" number of turns ratio is utilized on the inputs, as a result of which the outputs are 1:1:1:1. Further, an example circuit confirmation can be implemented with a series, neutral, or parallel connection state.

Figure 16:
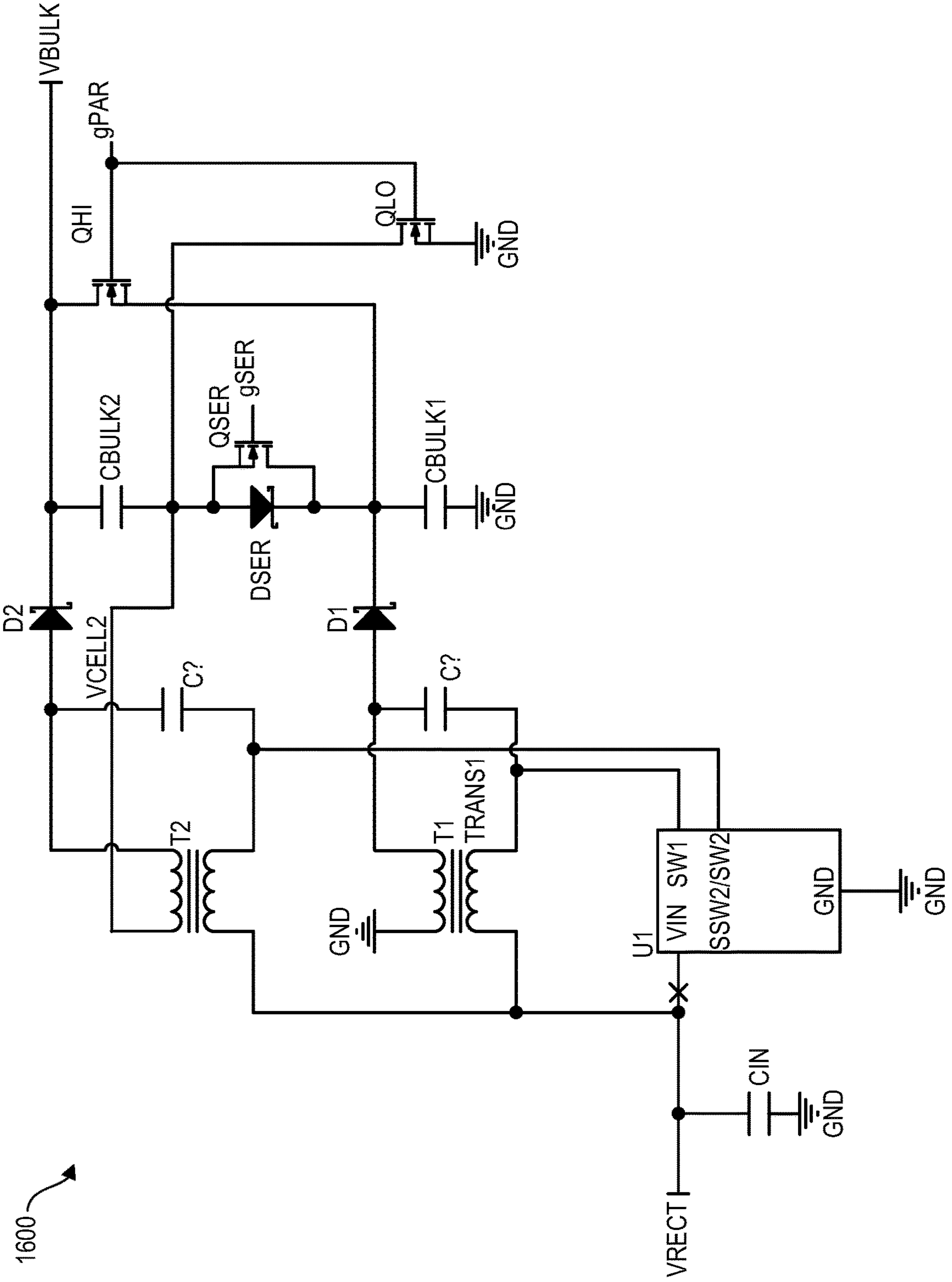
FIG. 16 illustrates a circuit configuration in which separate switching phrases are utilized to sequentially operate two input inductors that can be galvanically isolated from two output inductors but coupled by mutual inductance and capacitive coupling elements, and the output inductors can be configured to charge the bulk capacitors through rectifiers, according to some aspects described and illustrated herein.

FIG. 16 illustrates a circuit configuration 1600 in which separate switching phrases are utilized to sequentially operate a number of inductors, according to one or more aspects described and illustrated herein. In aspects, it is noted that loading an inductive winding of a generator with a DC to DC converter results in a high resistance of a winding. The resulting losses are based on the average of the square of the currents in the source windings while the energy transfer is based on the average current. It is advantageous to extract energy with the current value being maintained at a particular level in order to improve energy extraction efficiency. Conventional DC to DC converters operate such that they charge an inductor to a peak current value or to a maximum "ON" time at a constant voltage and then dumping that stored energy into a second circuit with 0 input current. As a result, a higher peak current and energy losses occur. An input capacitance somewhat mitigates these energy losses but leaves abandoned energy on the input at every voltage dip of the rectified waveform. The sequential switching enables a more uniform input current and facilitates modification the ON time of each switch to maintain balance of the associated capacitor voltages in a series connected state.

In aspects, minimizing the input capacitance is beneficial in that doing so reduces the abandoned energy. In aspects, a converter with N phases can be sequentially operated and can have input duty cycles of less (e.g., marginally less) than 1/N such that the net input duty cycle could approach 100%. The circuit configuration 1600 is a sawtooth input based circuit that has non-uniform current. However, the current profile of the circuit configuration 1600 is more uniform than a low duty cycle single phase switcher at a particular (e.g., same) power transfer level. In aspects, it is noted that the buck-boost based circuit as described in the present disclosure can be implemented using $2^M$ phases and X:(1+$2^J$) winding coupled inductors, which can be utilized to implement N=M+J levels of recursion in the FET switching and attain $2^N$ states of capacitance.

Figure 17:
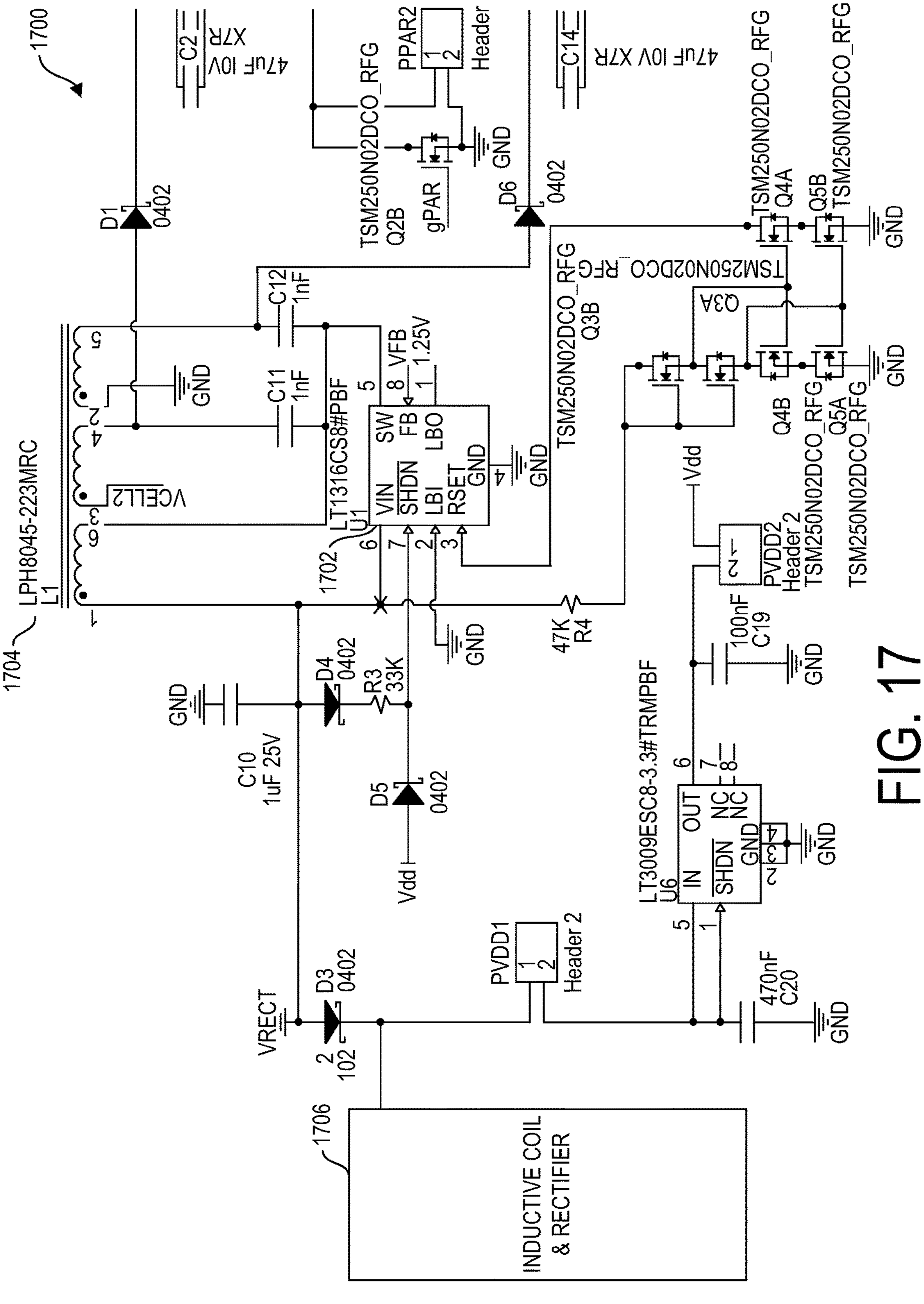
FIG. 17 illustrates a circuit configuration in which the input voltage can be sampled through a resistor to produce a reference current for a voltage dependent current limit, according to some aspects described and illustrated herein.

FIG. 17 illustrates a circuit configuration 1700. Regarding this configuration, the input voltage 1702 can be sampled through a resistor to produce a reference current for a voltage dependent current limit. In operation, the peak current of the input inductors can be controlled, which controls the average current associated with the winding. In aspects, the adjustment resistor is replaced with a current mirror. As a result, the current limit of the Integrated Circuit (IC) is dependent on the input voltage. Additionally, for a portion of the input voltage waveform in which the voltage is greater than the under voltage lockout value, the input has an approximately constant resistance. In aspects, the inductive windings of an electromechanical source 1704 generates the maximum power transfer when an equivalent resistance of the DC to DC input is equal to the resistance of the windings of the electromechanical source. Further, the maximum energy is extracted when the equivalent resistance of the DC to DC input is equal to approximately 1.5× the resistance of the windings of the electromechanical source. Further, the circuit configuration 1700 also include an inductive coil coupled to a rectifier (1706) for the purpose of operating as a filter.

Figure 18:
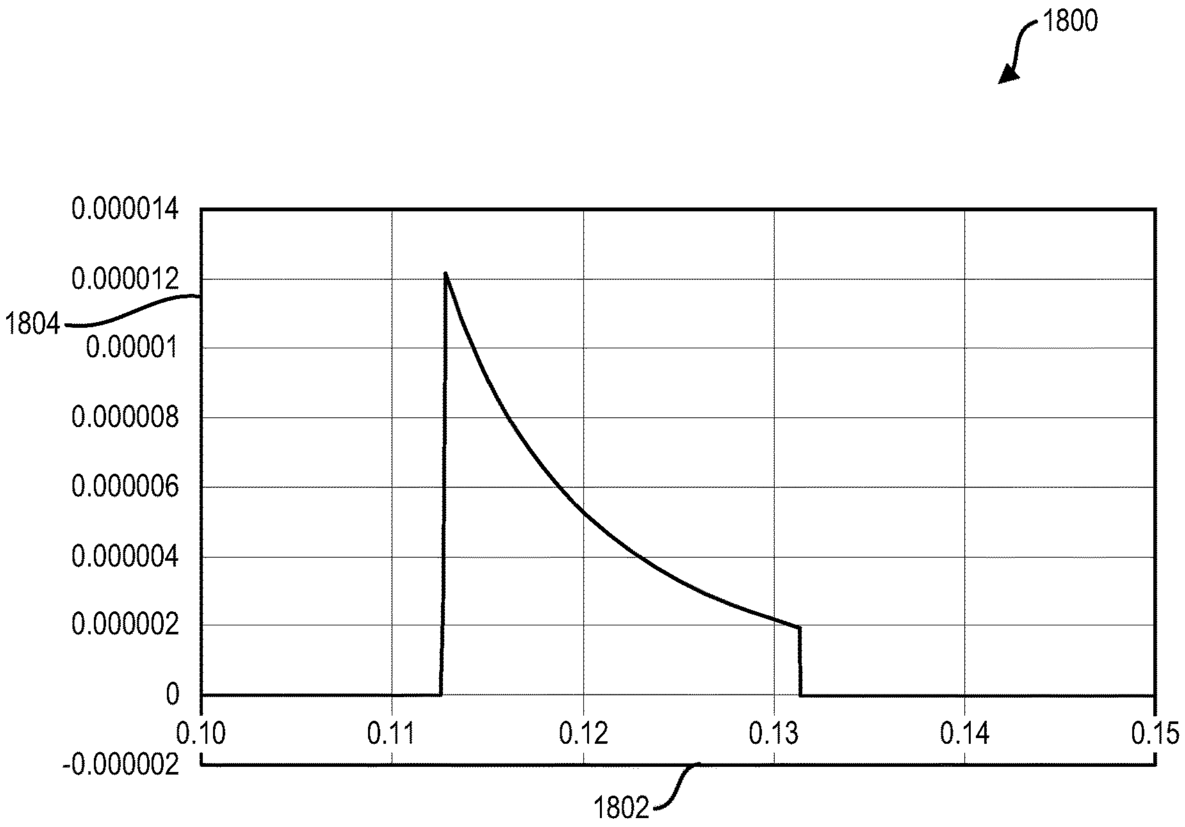
FIG. 18 illustrates an example graphical representation that is representative of a baseline level of efficiency of energy extraction, according to some aspects described and illustrated herein.

FIG. 18 illustrates an example graphical representation 1800 that is representative of a level of improvement in efficiency of energy extraction, according to one or more aspects described and illustrated herein. Specifically, the example graphical representation 1800 is associated with the power delivered to a regulator having a 1.8V undervoltage, and a resistive load powered by the DC to DC converter and unswitched bulk capacitors, e.g., when the DC to DC converter has a 14.7K fixed resistive limit resistance and results in 3.08 mJ of recovered energy. The example graphical representation 1800 includes an x-axis that corresponds to time 1802 and a y-axis that corresponds to power values 1804 represented by Watts (W).

Figure 19:
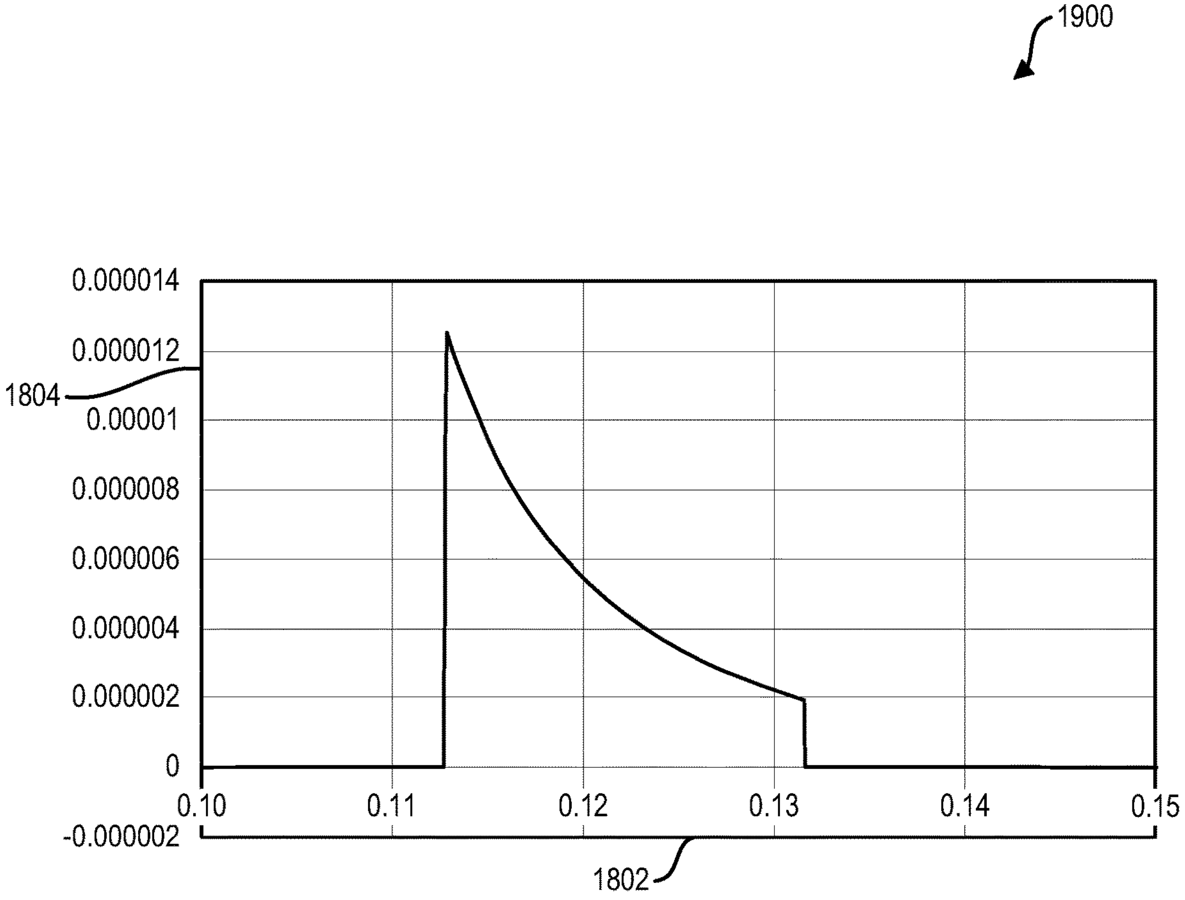
FIG. 19 illustrates an example graphical representation that is representative of an improved level of efficiency of energy extraction, associated with a circuit configuration that can have an input-controlled current mirror, according to some aspects described and illustrated herein.

FIG. 19 illustrates an example graphical representation 1900 that is representative of a level of efficiency of energy extraction, associated with a circuit configuration that may not have a current mirror or a capacitive switching feature. Specifically, the example graphical representation 1900 can be associated with 3.19 mJ of recovered energy based on replacing a fixed resistance current limit with a suitable resistor from the input voltage to a current mirror.

Figure 20:
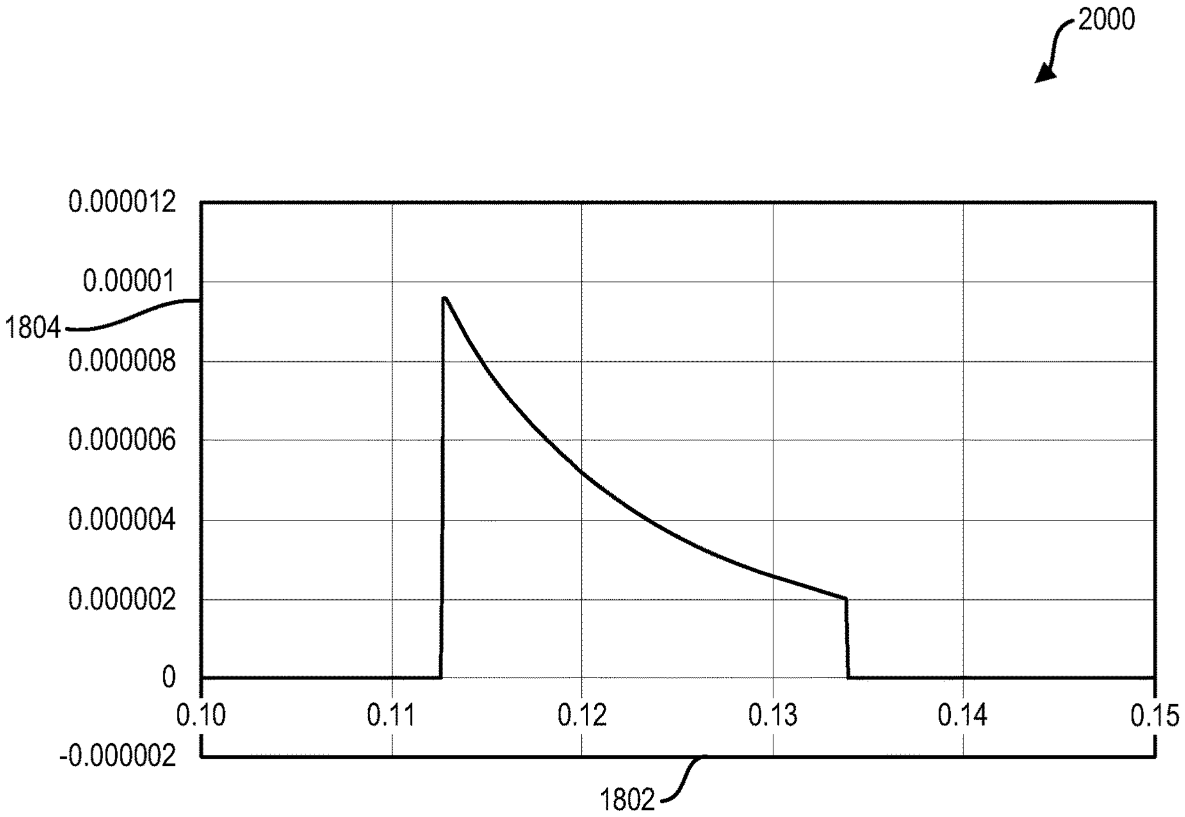
FIG. 20 illustrates an example graphical representation that is representative of a baseline level of efficiency of energy extraction, according to a circuit configuration that does not employ a capacitive switching features, according to some aspects described and illustrated herein.

FIG. 20 illustrates an example graphical representation 2000 that is representative of a level of efficiency of energy extraction, according to a circuit configuration that also may not have a current mirror or a capacitive switching features. Specifically, the example graphical representation 2000 is associated with 3.12 mJ of recovered energy or increased usable energy for a switched versus a single-state capacitor. Such a recovered energy amount is comparable to the scenario as described in FIG. 21.

Figure 21:
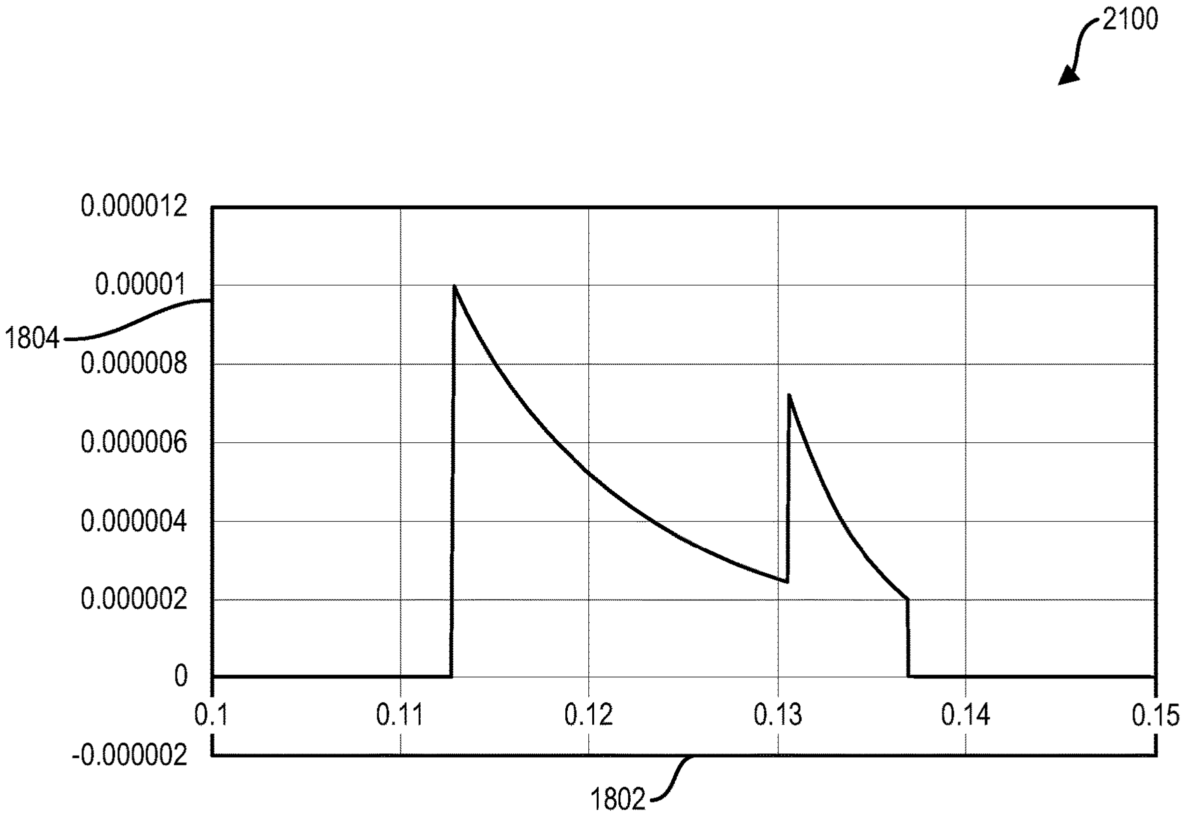
FIG. 21 illustrates an example graphical representation that is representative of an improved level of efficiency of energy extraction, based on a use of a capacitive switching feature, in accordance with some aspects described and illustrated herein.

FIG. 21 illustrates an example graphical representation 2100 that is representative of a level of improvement in efficiency of energy extraction, according to one or more aspects described and illustrated herein. Specifically, the example graphical representation 2100 is associated with 3.7 mJ of recovered energy upon switching the capacitance from a parallel configuration to a series configuration for the purpose of recovering some of the abandoned energy.

In the following examples and claims, the term "isolated functional coupling" shall refer to magnetic coupling between two or more inductors, capacitive coupling between two series-connected capacitors, or a combination of both.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Further non-limiting aspects or aspects are set forth in the following numbered examples:

Example 1: A power conversion apparatus comprises at least a first inductor and a second inductor, a rectifier, a load, and at least a first bulk capacitor and a second bulk capacitor, wherein: the first inductor is galvanically isolated from the second inductor, each of the first inductor and the second inductor is an output-inductor of the power conversion apparatus, the rectifier is configured to charge at least the first bulk capacitor and the second bulk capacitor, each of the at least the first bulk capacitor and the second bulk capacitor is coupled to the load, and interconnections of the at least the first bulk capacitor and the second bulk capacitor is switched between at least one of from an electrical series connection to an electrical parallel connection and from the electrical parallel connection to the electrical series connection.

Example 2: The power conversion apparatus of example 1, wherein the power conversion apparatus further includes a third inductor, wherein the third inductor is an input inductor that is galvanically isolated from the at least the first inductor and the second inductor, and the third inductor is coupled to the at least the first inductor and the second inductor via isolated functional coupling.

Example 3: The power conversion apparatus of example 1, further comprising a third inductor and a fourth inductor, wherein each of the third inductor and the fourth inductor is an input inductor, each of the at least the first inductor and the second inductor is galvanically isolated from each of the third inductor and the fourth inductor, and the at least the first inductor is galvanically isolated from the at least the second inductor.

Example 4: The power conversion apparatus of example 3, further wherein each of the first inductor and the second inductor is coupled to at least one of the third inductor and the fourth inductor via a magnetic field based connection.

Example 5: The power conversion apparatus of example 3, wherein each of the at least the first inductor and the second inductor is coupled to at least one of the third inductor and the fourth inductor via a capacitive connection.

Example 6: The power conversion apparatus of example 3, further comprises an input source.

Example 7: The power conversion apparatus of example 6, wherein each of the at least the first inductor and the second inductor is coupled to the input source, and the coupling to the input source is switched in an alternating manner such that only one input inductor is connected to said input source at a time.

Example 8: The power conversion apparatus of example 6, further comprising a plurality of switched input inductors, wherein each of the plurality of switched input inductors is coupled to a corresponding output inductor via isolated functional coupling, and each of the at least the first inductor and the second inductor is coupled to a corresponding bulk capacitor through a rectifying element.

Example 9: A system comprising at least two output inductors, a rectifier, a plurality of switches, at least two bulk capacitors, and a load; and wherein each of the at least two output inductors is coupled to one of the at least two bulk capacitors via the rectifier, and the plurality of switches are operable to commutate the at least two bulk capacitors to an output in an electrical series connection or an electrical parallel connection.

Example 10: A system of example 9, wherein the system of example 9 is a DC to DC converter.

Example 11: An apparatus comprising: a plurality of windings magnetically coupled to an energy source, each of the plurality of windings have a property, wherein the property corresponds to an inductance, a current, or a stored energy, a plurality of switches, each of the plurality of switches are communicatively coupled to windings so as to place said windings in a plurality of combinations of series and parallel connections, and control logic that operates the plurality of switches for controlling the plurality of windings.

Example 12: The apparatus of example 11, wherein the property is uniform for the plurality of windings, and the plurality of windings include two windings and the plurality of switches include three switches that are configurable to situate the plurality of windings in a series configuration and a parallel configuration relative to a load.

Example 13: The apparatus of example 11, wherein the plurality of windings comprises four windings and the plurality of switches comprise nine switches for configuring the plurality of windings and the plurality of switches in a 4-series, a 4-parallel, and a 2×2 configurations relative to a load.

Example 14: The apparatus of example 11, wherein the plurality of windings comprises two windings and the plurality of switches comprise seven switches for providing a series and a parallel state of connection of the windings and a positive or a negative connection of the plurality of windings relative to a load.

Example 15: The apparatus of example 11, wherein at least one switch of the plurality of switches is modulated to control power to a load.

Example 16: A system comprising: a plurality of capacitors, each of the plurality of capacitors having a property, wherein the property corresponds to a capacitance, a voltage, or a stored energy, a plurality of switches, each of the plurality of switches are communicatively coupled to the plurality of capacitors so as to place the plurality of capacitors in a plurality of combinations of series and parallel connections, and control logic that operates the plurality of switches for controlling a connection of the plurality of capacitors.

Example 17: The system of example 16, the property is uniform for the plurality of capacitors; and each of the plurality of capacitors comprises two capacitors and the plurality of switches provide a series and a parallel state of connection of the plurality of capacitors to a source.

Example 18: The system of example 17, wherein the plurality of capacitors includes four capacitors and the plurality of switches include nine switches, wherein the capacitors and switches are configurable in a 4-series, a 4-parallel, and a 2×2 configuration.

Example 19: A system comprising: a plurality of capacitors and three switches, and the plurality of capacitors are electrically coupled in a multiple recursive stage based sub-circuit, wherein a first stage comprises a subset of the plurality of capacitors and the three switches, and the three switches are operable to alter a connection of the subset of the plurality of capacitors from a series connection to a parallel-connection and from the parallel-connection to the series connection.

Example 20: The system of example 19, further comprising a plurality of galvanically isolated output inductors, wherein each of the plurality of galvanically isolated output inductors are coupled to a corresponding one of the plurality of capacitors using a rectifying component.

Example 21: The system of example 19, further comprising at least one input inductor, wherein the plurality of galvanically isolated output inductors are coupled to the at least one input inductor via an isolated functional coupling connection.

Example 22: A system comprising a plurality of capacitors, a rectifier, a controller, and a plurality of switches, wherein the plurality of switches are operably connected with the plurality of capacitors, and the controller operable to control each of the plurality of switches to alter a connection-status of the plurality of capacitors from a series connected configuration to a parallel connected configuration and from the parallel connected configuration to the series connected configuration.

Example 23: The system of example 22, further comprising a plurality of galvanically isolated output inductors, each of the plurality of galvanically isolated output inductors are coupled to a corresponding one of the plurality of capacitors by the rectifier.

Example 24: The system of example 23, further comprising at least one input inductor, wherein the plurality of galvanically isolated output inductors are coupled to the at least one input inductor via an isolated functional coupling connection.

It is noted that the techniques described herein enable low frequency resonant energy harvesting. Further, these techniques address related problems for any energy harvesting where the voltages and currents range well beyond the ideal range of the harvesting electronics. The above described techniques and approach can be applied to capacitive piezoelectric harvesters and other harvesters with analogous combinations and methods.

The techniques and devices described herein enable are also directed to energy harvesting, the applications of digitally tunable inductors and capacitors. In particular, the techniques, devices, and configuration described herein are directed to provide operation such that the commutation losses of capacitor networks are small. Moreover, these techniques can be utilized in applications that involve adaptive filtering of EMI, constant voltage charge accumulation (solid state battery), adaptive charge pumps, and many other applications.

The techniques and claims herein describe digitally variable capacitors and means to power them from power converters and chargers based on switched inductive power conversion. The methods are equally applicable to switched capacitive power conversion with the references to output and input inductors replaced by input-connected and output-connected states of a switched capacitor of a charge pump by way of non-limiting example.

What is claimed is:

1. A power conversion apparatus comprising:

at least a first inductor, a second inductor, and a third inductor;

at least a first rectifier and a second rectifier;

a load; and at least a first bulk capacitor and a second bulk capacitor; wherein:

each of the first inductor and the second inductor is an output-inductor of the power conversion apparatus, the first inductor is connected to the first rectifier and the first rectifier is connected to the first bulk capacitor with a first return path from the first bulk capacitor to the first inductor, the second inductor is connected to the second rectifier and the second rectifier is connected to the second bulk capacitor with a second return path from the second bulk capacitor to the second inductor, the third inductor is an input inductor coupled to the at least first inductor and the second inductor using isolated functional coupling, and interconnections of the at least the first bulk capacitor and the second bulk capacitor are switched between an electrical series state and an electrical parallel state using a control system, wherein the control system is responsive to a voltage of the first bulk capacitor and the second bulk capacitor, and wherein the control system is capable of regulating the voltage between a lower bound and an upper bound by switching to the electrical series state when the voltage is below the lower bound and switching to the electrical parallel state when the voltage is above the upper bound.

2. The power conversion apparatus of claim 1, further comprising a fourth inductor, wherein:

the fourth inductor is an input inductor.

3. The power conversion apparatus of claim 2, further wherein:

each of the first inductor and the second inductor is coupled to at least one of the third inductor and the fourth inductor via magnetic field based connections.

4. The power conversion apparatus of claim 2, wherein:

each of the first inductor and the second inductor is coupled to at least one of the third inductor and the fourth inductor via capacitive connections.

5. The power conversion apparatus of claim 2, further comprises an input source.

6. The power conversion apparatus of claim 5, wherein:

each of the first inductor and the second inductor is coupled to the input source; and the coupling to the input source is switched in an alternating manner such that only one input inductor is connected to said input source at a time.

7. The power conversion apparatus of claim 5, further comprising a plurality of switched input inductors, wherein:

each of the plurality of switched input inductors is coupled to a corresponding output inductor via isolated functional coupling; and each of the first inductor and the second inductor is coupled to a corresponding bulk capacitor through a corresponding rectifier.

8. A system comprising:

at least two output inductors;

at least one input indictor;

at least two rectifiers;

a plurality of switches;

at least two bulk capacitors; and a load; and wherein each of the at least two output inductors is coupled to a corresponding bulk capacitor using a corresponding rectifier, with a return path from the corresponding bulk capacitor to a corresponding output inductor, the input inductor is coupled to the at least two output inductors using isolated functional coupling, and the plurality of switches are operable to commutate the at least two bulk capacitors between an electrical series state and an electrical parallel state using a control system, wherein the control system is responsive to a voltage of the at least two bulk capacitors, and wherein the control system is capable of regulating the voltage between a lower bound and an upper bound by switching to the electrical series state when the voltage is below the lower bound and switching to the electrical parallel state when the voltage is above the upper bound.

9. The system of claim 8, wherein the system is a charging section of an energy harvester.

* * * * *